United States Patent [19]
Honda et al.

[11] Patent Number: 5,565,972
[45] Date of Patent: Oct. 15, 1996

[54] ELECTROPHOTOGRAPHIC PRINTER USING A CONTINUOUS-FORM RECORDING SHEET

[75] Inventors: Ryoji Honda, Asaka; Masahiro Kita, Tokyo; Ikuo Negoro, Sakado; Tomoyuki Nishikawa, Matsudo; Takaaki Yano, Kawagoe; Tatsuya Yoshida, Shimooshi; Shoji Kamasako, Tsurugashima-machi; Tsutomu Sato, Tokyo; Kiyoshi Negishi, Tsurugashima-machi, all of Japan

[73] Assignee: Asahi Kogaku Kogyo Kabushiki Kaisha, Tokyo, Japan

[21] Appl. No.: 889,146

[22] Filed: May 27, 1992

Related U.S. Application Data

[63] Continuation-in-part of Ser. No. 750,281, Aug. 27, 1991, abandoned, which is a continuation of Ser. No. 535,477, Jun. 11, 1990, Pat. No. 5,063,416, which is a continuation-in-part of Ser. No. 854,007, Mar. 19, 1992, abandoned, which is a continuation of Ser. No. 611,836, Nov. 13, 1990, abandoned.

[30] Foreign Application Priority Data

Nov. 10, 1989 [JP] Japan ................................. 1-293712
Apr. 20, 1990 [JP] Japan ................................. 2-105642
Apr. 26, 1990 [JP] Japan ................................. 2-111210

[51] Int. Cl.⁶ ................................................. G03G 21/00
[52] U.S. Cl. ........................... 355/317; 226/27; 355/311
[58] Field of Search ................................. 355/317, 311, 355/316, 309, 308, 203, 204; 226/24, 26, 27

[56] References Cited

U.S. PATENT DOCUMENTS 3,806,241  4/1974  Gregg et al. .
3,856,128  12/1974  Taggart .
3,909,258  9/1975  Kotz .
3,976,375  8/1976  Kurita et al. .
3,987,884  10/1976  Buxton .
4,042,298  8/1977  Herrmann .
4,249,820  2/1981  Freeman et al. .
4,297,716  10/1981  Hirayama et al. .
4,377,333  3/1983  Tsuji et al. .
4,429,984  2/1984  Kiba et al. .

(List continued on next page.)

FOREIGN PATENT DOCUMENTS 0314517  5/1989  European Pat. Off. .
0362842  4/1990  European Pat. Off. .
2734314  2/1978  Germany .
3811413  10/1988  Germany .
3913594  11/1989  Germany .
3937836  6/1990  Germany .
53-3340  1/1978  Japan .
58-51864  11/1983  Japan .
60-262178  12/1985  Japan .
60-249462  12/1985  Japan .
62-233276  10/1987  Japan .

OTHER PUBLICATIONS

Laser Printers Users Guide, "Pentax Teknologies Laserfold 240", Pentax Teknologies Corporation, Broomfield, Colorado, Revision 05 (Jan. 30, 1990).

*Primary Examiner*—R. L. Moses
*Attorney, Agent, or Firm*—Greenblum & Bernstein, P.L.C.

[57] ABSTRACT

An electrophotographic printer is capable of using a plurality of types of continuous form recording media having different page lengths, respectively. In the printer, a photoconductive member is charged and exposed to light carrying image data to form a latent image. In operation, one of the plurality of types of recording media is selected, and a portion of the photoconductive member corresponding to a page of the selected one of the plurality of types of recording media is exposed to light. In another embodiment, a laser beam printer utilizes a continuous-form recording sheet, wherein two control members are provided for, respectively, controlling the recording sheet so as to be discharged from the printing device after a printing operation, and for controlling the recording sheet so as to be located at a position from which a printing operation is restarted. Thus, recording sheets are not wasted when printer output is started.

88 Claims, 21 Drawing Sheets

U.S. PATENT DOCUMENTS

| | | |
|---|---|---|
| 4,468,113 | 8/1984 | Motohashi et al. . |
| 4,478,508 | 10/1984 | Kato et al. . |
| 4,563,081 | 1/1986 | Sato . |
| 4,595,279 | 6/1986 | Kuru et al. . |
| 4,607,572 | 8/1986 | Pou et al. . |
| 4,609,279 | 9/1986 | Hausmann et al. . |
| 4,640,880 | 2/1987 | Kawanishi et al. . |
| 4,843,429 | 6/1989 | Avritt et al. . |
| 4,844,434 | 7/1989 | Acquaviva et al. . |
| 4,870,434 | 9/1989 | Negishi et al. . |
| 4,890,140 | 12/1989 | Negoro et al. . |
| 4,897,675 | 1/1990 | Negishi . |
| 4,912,490 | 3/1990 | Negoro et al. . |
| 4,928,133 | 5/1990 | Fulton . |
| 4,941,377 | 7/1990 | Ishihara et al. . |
| 4,943,863 | 7/1990 | Ainoya . |
| 4,949,104 | 8/1990 | Negoro et al. . |
| 4,963,941 | 10/1990 | Negishi et al. . |
| 4,998,835 | 3/1991 | Negishi et al. . |
| 5,019,872 | 5/1991 | Zajac, Jr. . |
| 5,061,957 | 10/1991 | Nishikawa et al. . |
| 5,061,967 | 10/1991 | Isobe . |
| 5,101,228 | 3/1992 | Nishikawa et al. . |
| 5,101,239 | 3/1992 | Nishikawa et al. . |
| 5,109,255 | 4/1992 | Nishikawa et al. . |

FIG. 10A
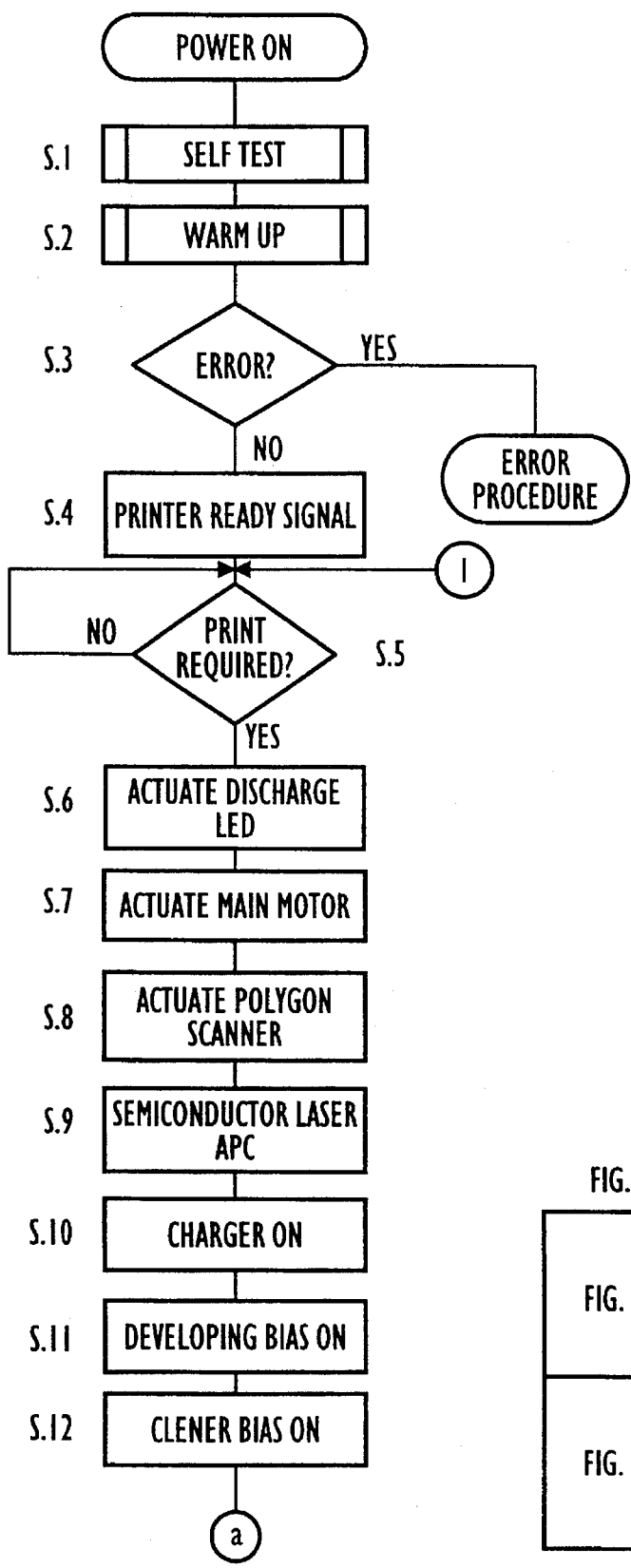
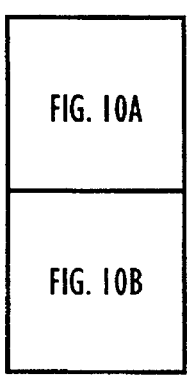

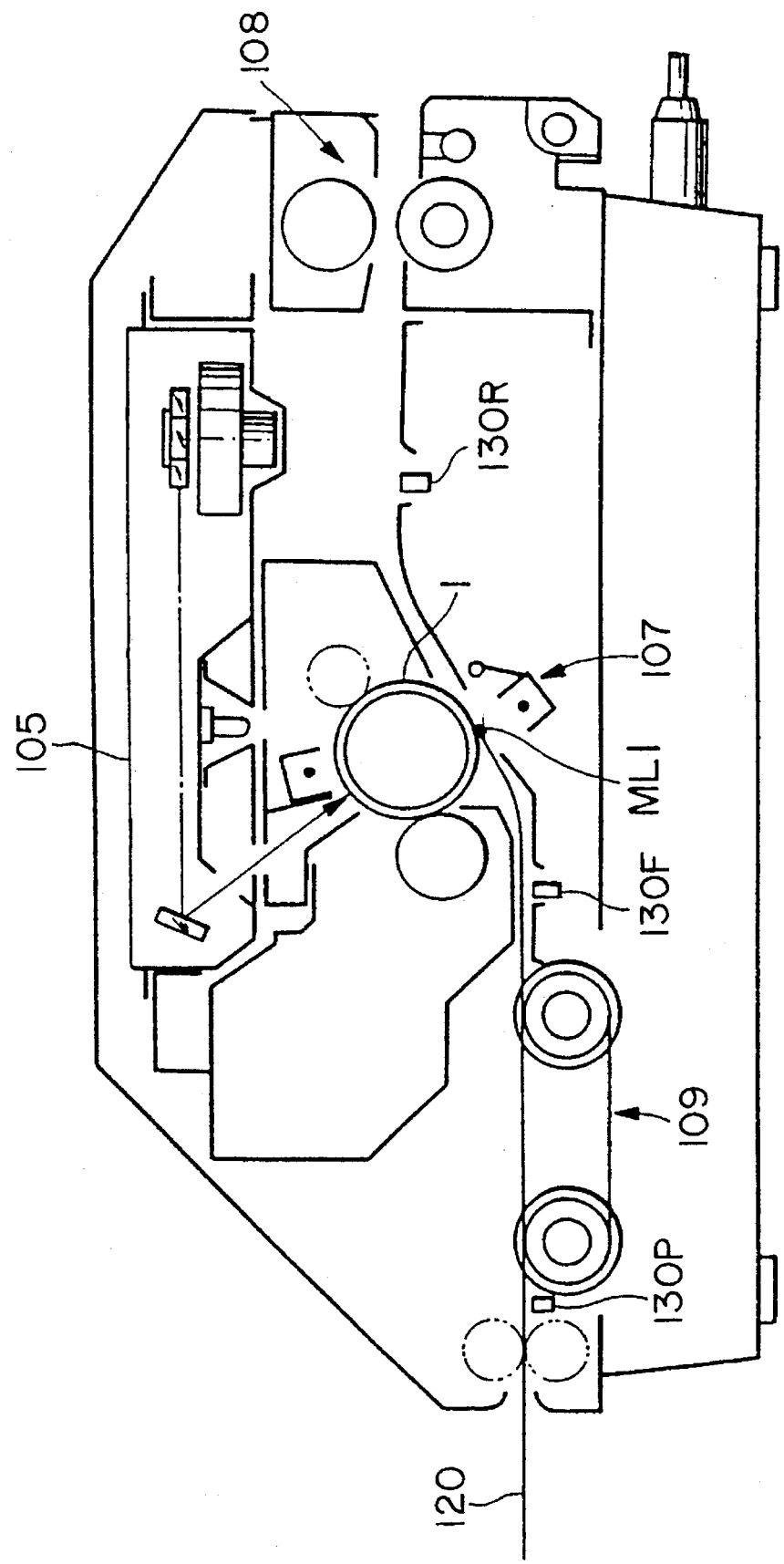

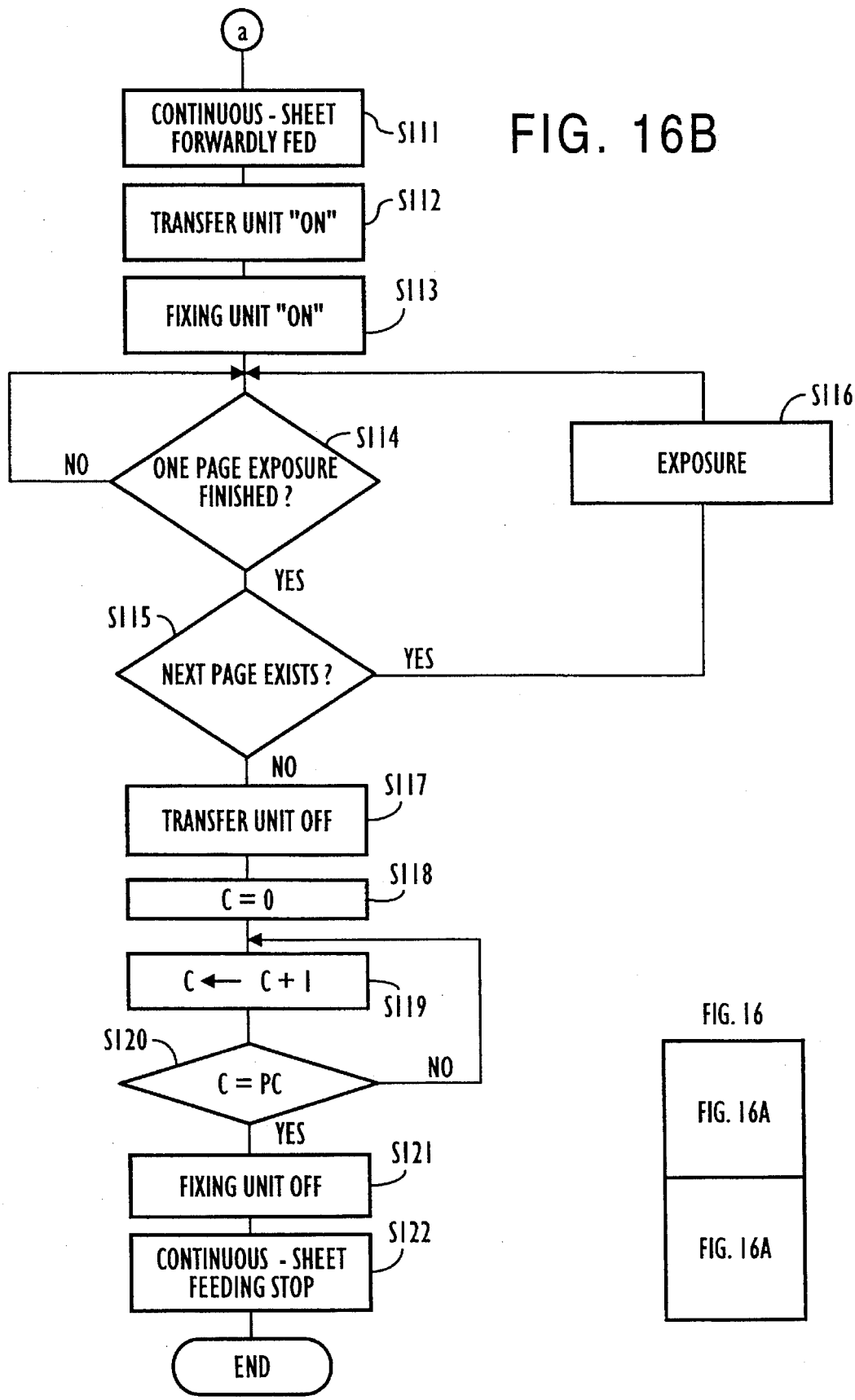

ELECTROPHOTOGRAPHIC PRINTER USING A CONTINUOUS-FORM RECORDING SHEET

CONTINUING STATUS

The present application is a continuation-in-part of U.S. patent application Ser. No. 07/750,281, filed on Aug. 27, 1991 in the name of Ryoji HONDA et al., entitled "Electrophotographic Printer Using A Continuous-Form Recording Sheet, now abandoned, which is a continuation of U.S. patent application Ser. No. 07/535,477, filed on Jun. 11, 1990, which is now U.S. Pat. No. 5,063,416. The present application is also a continuation-in-part of U.S. patent application Ser. No. 07/854,007, filed on Mar. 19, 1992 in the name of Tomoyuki NISHIKAWA et al., entitled "Printer", now abandoned, which is a continuation of U.S. patent application Ser. No. 07/611,836, filed on Nov. 13, 1990, which is now abandoned. The disclosures of all of the above-listed parent applications are expressly incorporated by reference, in their entireties, herein. The present application does not include substantive disclosure not present in the parent applications; and is thus a continuation-in-part only because no single one of the parent applications alone includes all of the presently disclosed material.

BACKGROUND OF THE INVENTION

1. Field of the Invention

The present invention relates to a printer capable of using a plurality of types of continuous form recording sheet having different page lengths.

2. Discussion of Background and Material Information

Dot impact type line printers are generally employed for printing output data from small computers on continuous form recording sheet. Such a line printer is designed to start printing with the storage of printing data on a line basis.

The continuous recording sheet is a so called fan-fold sheet which is foldable and provided with perforation lines. The foldable part is supplied with perforation lines so that the part may be torn off easily. In this case, the printer is often arranged so that it prints data in a portion other than the perforated part, so that the data thus printed is prevented from being cut apart when the paper is torn off.

A printer has been proposed which uses the continuous recording sheet employing an electrophotographic image transfer system for improving printing speed and the like.

Electrophotographic image transferring is the art of printing data through the steps of exposing the charged circumferential surface of a photoconductive drum to light to form a latent image thereon, developing the image thus exposed to light by sticking toner thereon, transferring the image onto the recording sheet, and fixing the image by means of a fixing unit, which may include a heat roller. The electrophotographic transfer system is generally utilized for copying machines and the like.

One such system is a laser beam printer which provides a hard copy of image information by scanning and exposing a photoconductive drum charged by laser beams. The beams are modulated based on image information such as figures, characters and the like, using the copy process of the above electrophotographic method.

The laser beam printer is very useful, because it can be widely used in such a manner that it prints figures of information received by an image reading unit such as an image scanner, or can be used as an output terminal of a facsimile machine, and it can output information at a high speed.

In general, such a laser beam printer conventionally comprises an existing electronic copying machine as a base unit thereof and uses so-called cut-type sheets cut into a predetermined size as a recording sheet. A so-called heat roll type fixing unit which comprises a pair of fixing rollers composed of a heat roller heated to a high temperature and a backup roller pressed thereagainst are provided. A recording sheet on which an unfixed toner image corresponding to the image information is placed, is caused to pass between the rollers so that it is heated and pressed, whereby the toner is melted and adhered on the recording sheet.

Incidentally, the electrophotographic method is such that the rotation of a photoconductive drum causes an exposed portion thereof to reach a transfer unit and a toner image is transferred onto the recording sheet fed at a speed identical to the peripheral speed of the photoconductive drum at the transfer unit. Thus, according to this process it is impossible to form images by intermittently interrupting the process due to the structure of the process.

Therefore, the laser beam printer is provided with a memory capable of storing at least one page of information, and when the one page of information is input therein, the printer outputs the information at one time.

It is of course possible to use this laser beam printer as an output terminal of a computer. In this case, however, the use of a continuous-form sheet similar to that used in a conventional line printer is desired. The continuous-form sheet is used in the conventional line printer is a so-called fan-folded sheet having feed holes and folded along perforated tear lines to enable the sheet to be simply cut off (hereinafter, simply referred to as a "continuous sheet").

When the electrophotographic system is used as a printer using a cut sheet type recording medium, the distance between the transfer and the fixing positions is unimportant, as it is only necessary to consider printer data on a single sheet. In case of a printer using a continuous recording sheet, however, it is important to determine the portion to be fixed. If all of the transferred toner image is fixed when printing is terminated, it wastes a length of sheet equivalent to the aforementioned distance. Consequently, the problem posed then is the extent to which the data transferred onto the recording sheet is fixed.

When printing performance is taken into consideration, the interruption and restart of transfer and fixation respectively should preferably be made such that the perforated part where data to be printed is discontinued is located at the transfer and fixing position. For this reason, perforation lines serving as page-to-page divisions should preferably be located at the transfer and fixing portion when printing is stopped.

With this arrangement, one page of the recording sheet bearing an unfixed toner image is left between the transfer and the fixing position when the printer is on standby condition after a normal printing operation is terminated. When data equivalent to the following one page is transferred, the existing page is subjected to fixation and is discharged. The continuous sheet is thereby prevented from being wasted by not effecting fixation each time a transfer is made.

There are normally two kinds of continuous sheets generally in use; namely, 11-inch and 12-inch long pages. The aforementioned space between the transfer and the fixing position has to be determined, depending on the page length of the sheet in use.

However, it is common that the positional relation between the transfer and the fixing positions has been fixed, and besides the diversified control is exercised in conformity with the fixed paper length. It is consequently impossible in principle for a conventional printer to use a plurality of sheets of paper of different lengths.

Also, when a continuous sheet is used in a laser beam printer using a roll fixing system, the length of a recording sheet feed path from a transfer unit to the fixing position of a fixing unit must be set to be substantially the same as the distance between the perforated tear lines of the continuous sheet in order to prevent a disadvantage, such that when the laser beam printer stops (during a pause or because operation is completed), a page being subjected to a fixing action is stopped in the state that it is held between a pair of fixing rollers, and semi-fixed toner in the process of being fixed remains caught between the pair of fixing rollers.

More specifically, since the continuous-sheet is finally cut off along the perforated tear lines for use, no image must be formed within a predetermined region in the vicinity of the perforated tear lines, and thus in a laser beam printer by which images are formed for each page, the tear lines where no image is formed are arranged to be stopped in the position where they correspond to the transfer unit. Consequently, when the length of the recording sheet feed path from the transfer unit to the fixing position is set to be substantially the same as the distance between the perforated tear lines of the continuous sheet, the above disadvantage can be avoided, because the vicinity of the tear line where no image is formed is caused to correspond to the position of the fixing unit where fixing action is effected, when the laser beam printer stops.

As a result, however, a problem arises in that the printer as a whole is made unnecessarily large in size to provide a necessary feed length for the recording sheet, and a plurality of kinds of continuous sheet, respectively having a different distance between perforated tear lines (i.e., the length of a page), cannot be interchangeably used in this laser beam printer. That is, continuous sheets having a different distance between perforated tear lines cannot be used.

SUMMARY OF THE INVENTION

It is therefore an object of the present invention to provide an improved printer capable of printing data on different kinds of paper having different page lengths.

For the above object, according to the invention, there is provided an electrophotographic printer capable of using a plurality of types of continuous form recording media having different page lengths, respectively, the printer comprising a photoconductive member to be charged and exposed to light carrying image data to form a latent image, the printer further comprising:

select means for selecting one of the plurality of types of recording media; and control means for controlling the printer in such a fashion that a portion of the photoconductive member corresponding to a page of the selected one of the plurality of types of recording media is exposed to the light.

It is another object of the invention to provide an improved electrophotographic printer which permits a fixing unit to be freely disposed without being regulated by the distance between the perforated lines of a continuous-form sheet.

For this purpose, according to the present invention, there is provided a printing device, which is capable of employing at least a continuous-form recording sheet having a plurality of printing segments on which an image is to be formed, each of the segments being designated by a plurality of perforations provided on the continuous-form recording sheet at a predetermined interval. A feeding device for feeding the continuous-form recording sheet along a predetermined feeding path, a forming device for forming the image on the continuous-form recording sheet, and a fixing device for fixing the image formed by the forming device on the continuous-form recording sheet are provided. The printing device further includes:

a discriminating mechanism for discriminating whether the forming operation of the image on the continuous-form recording sheet is finished; and a controlling mechanism for controlling the feeding device so as to feed the continuous-form recording sheet in such a manner that a trailing end of a segment on which the forming operation has been finished is located at a predetermined position following the fixing device in case that it is discriminated by the discriminating mechanism that the forming operation is finished.

Another controlling mechanism is provided for controlling the feeding device in such a manner that the trailing end is located at the forming device after the trailing end is located at the predetermined position, whereby a leading edge of the succeeding (i.e., next) segment after the segment on which the forming operation has been finished, is located at the forming device.

DESCRIPTION OF THE ACCOMPANYING DRAWINGS

Figure 10B:
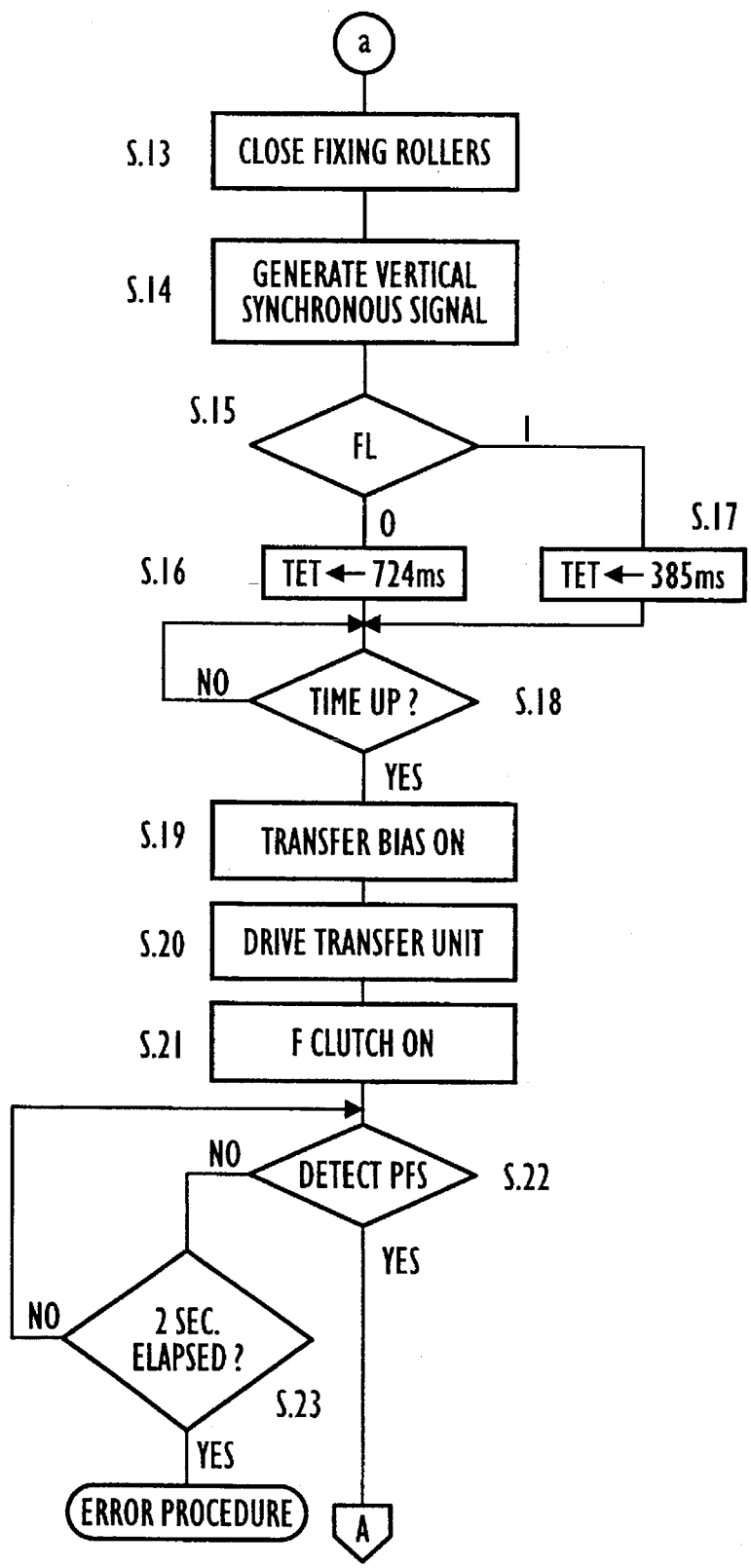
Figure 12:
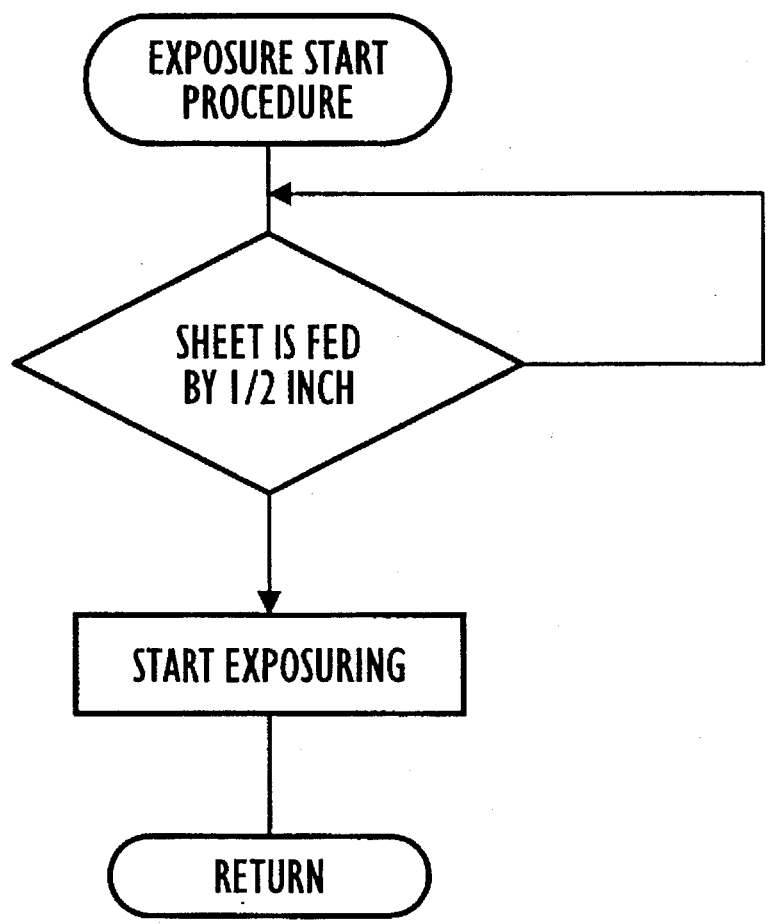
Figure 13:
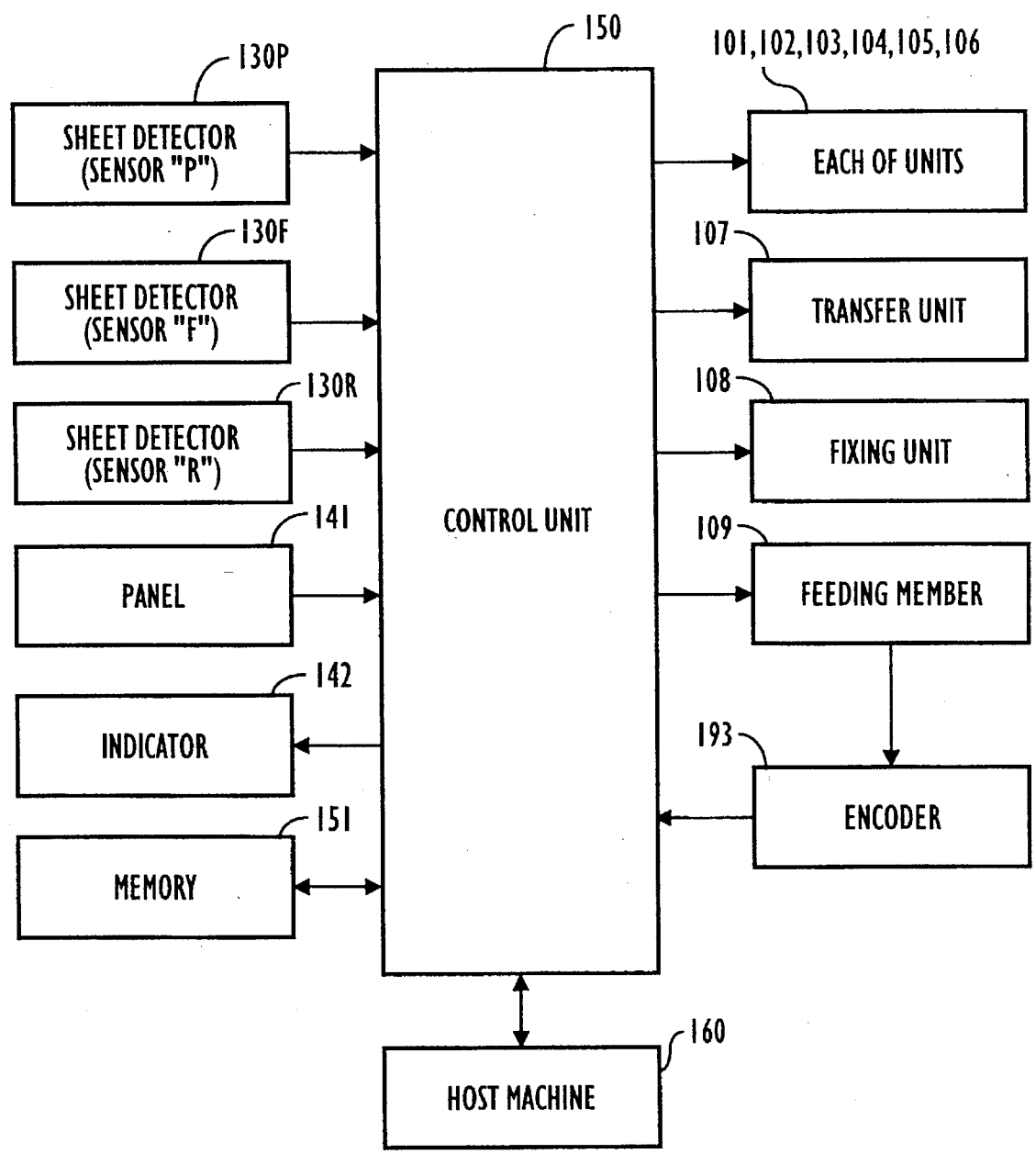
Figure 14:
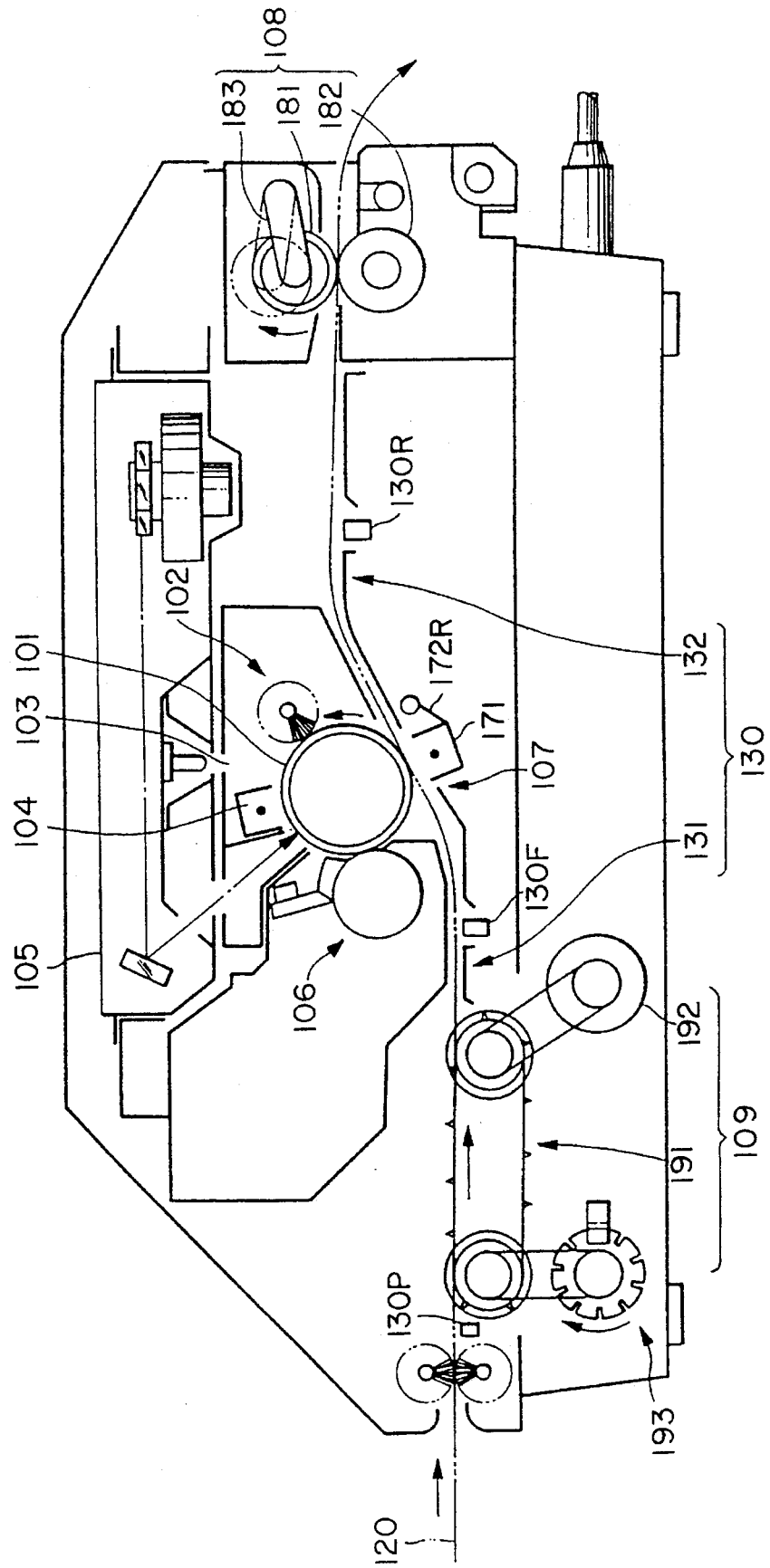
Figure 16A:
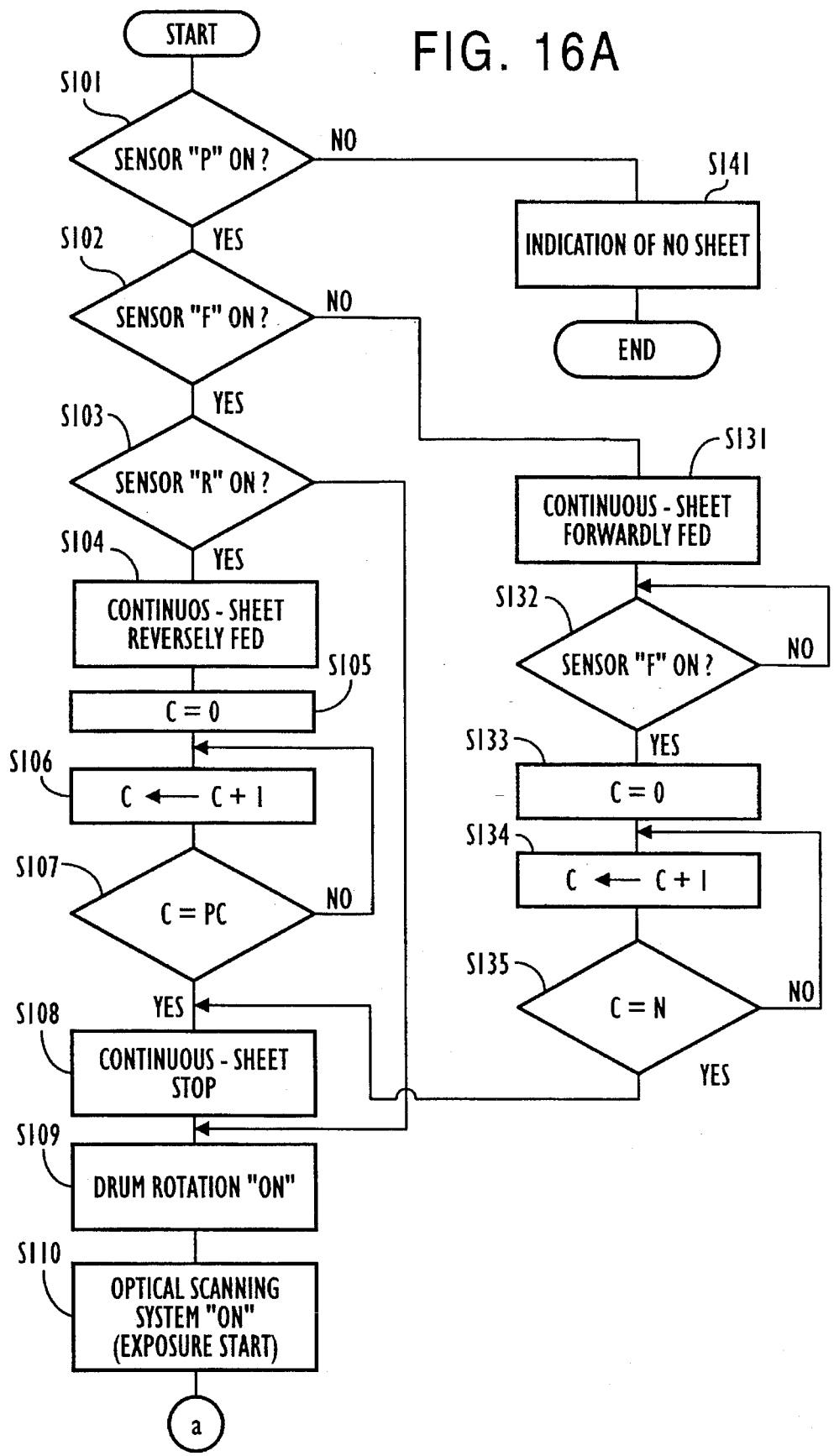
Figure 17A:
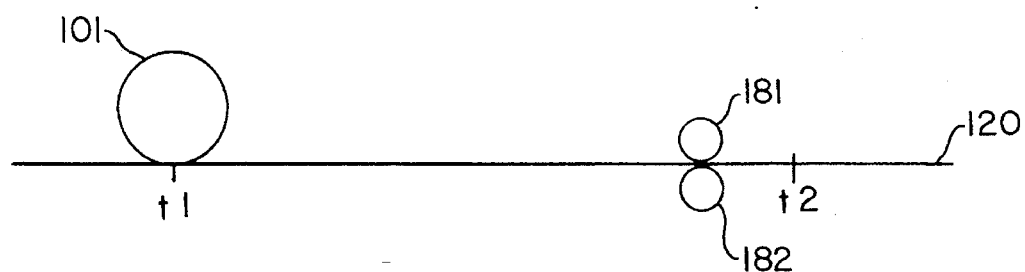
Figure 17B:
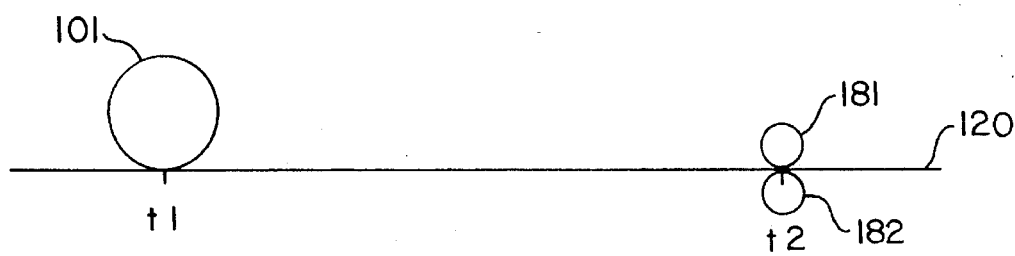
Figure 17C:
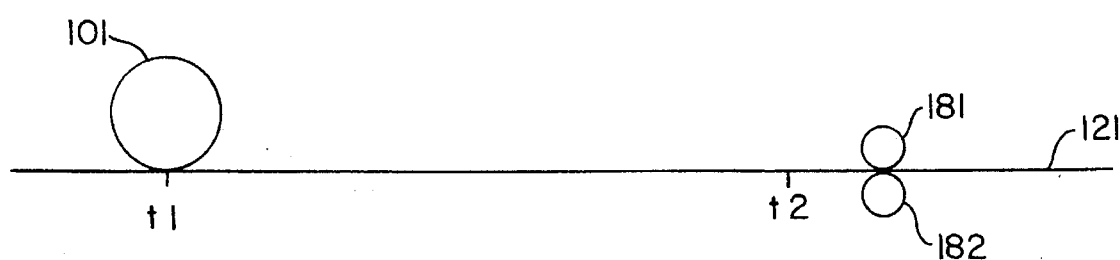

FIGS. 10 (A and B) and 11 (A and B) are flow charts illustrating the performance of one printer embodying the present invention;

FIG. 12 is a flow chart illustrating an exposure start procedure;

FIG. 13 is a block diagram of a control circuit of an electrophotographic printer using a continuous-form recording sheet according to another embodiment of the present invention;

FIG. 14 is a schematic diagram of a laser beam printer according to a second embodiment of the present invention;

FIGS. 15A through 15D are diagrams for explaining operation of the laser beam printer illustrated in FIG. 14;

FIGS. 16 (16A and 16B) are flow charts for controlling the operation of the laser beam printer of FIG. 14; and FIGS. 17A through 17C are views for explaining the positional relationships of the distance from the drum to the rollers and the interval between perforated tear lines of the continuous-form recording sheet.

DETAILED DESCRIPTION OF THE PREFERRED EMBODIMENTS

Figure 1:
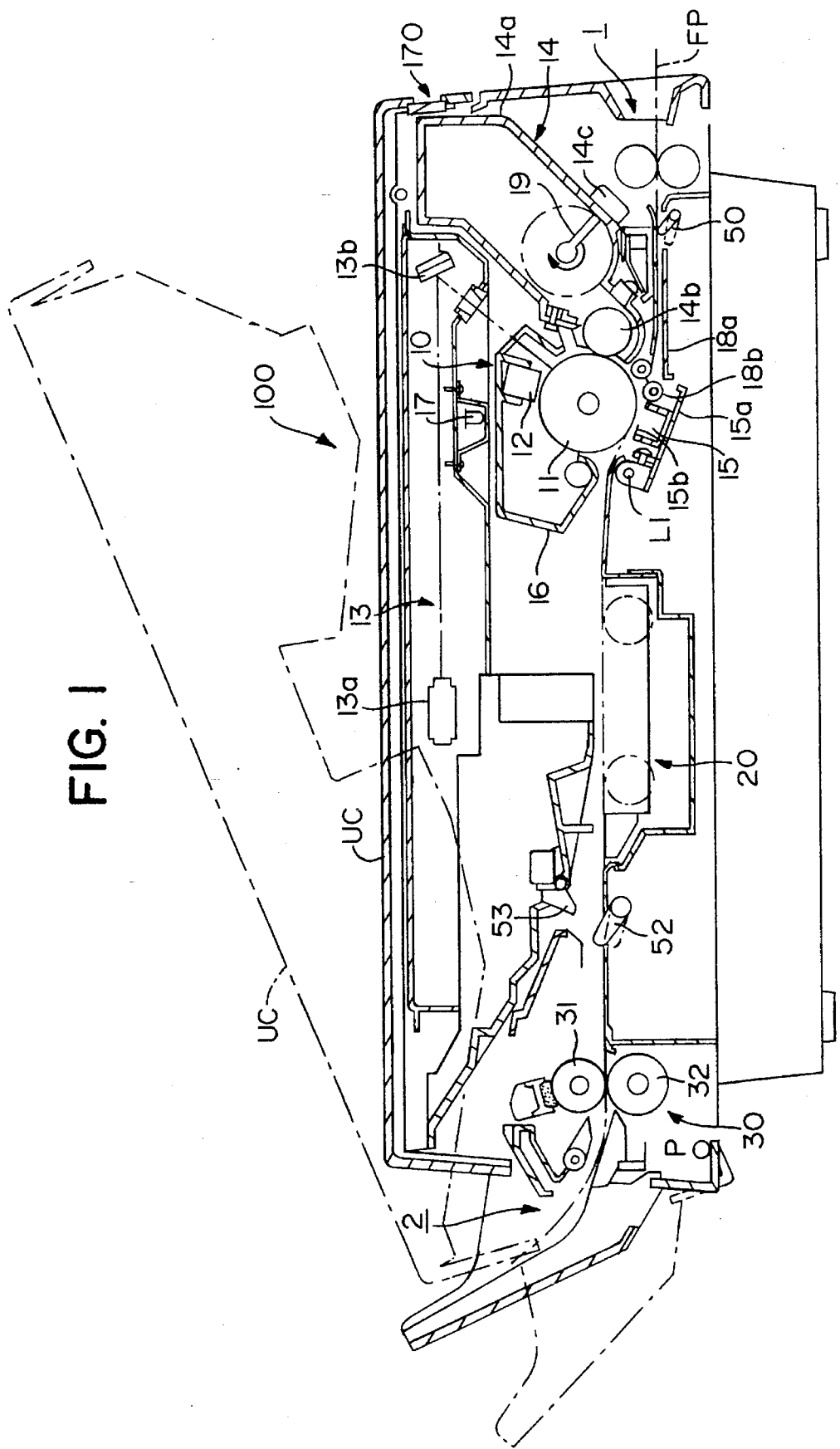
FIG. 1 is a schematic sectional view of one printer embodying the present invention.

A printer 100 shown in FIG. 1 is one embodiment of a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image in order to fix the toner on the recording sheet. Light carrying printing data from a host computer or the like is emitted from a laser scanning unit (LSU) 13, the charged circumferential surface of a photoconductive drum 11 is exposed to the light, and a latent image is formed on the circumferential surface of the photoconductive drum 11. Toner is stuck to the circumferential surface of the photoconductive drum 11 to develop a toner image by a developing unit 14. Then the toner image is transferred onto the recording sheet at a transfer charger 15, and the image thus transferred is fixed by a fixing unit 30. The printer 100 employs the electrophotographic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

The printer of this embodiment is designed to use the continuous recording sheet whose one-page length is primarily 11 inches, so that the set distance between the transfer unit 10 and the fixing unit 30 is 11 inches. Further, this printer is designed to be capable of using two kinds of paper, namely 11 inches and 12 inches in one-page length as described later, and the switching between these two kinds of page lengths is effected by switching the operation of the printer through software.

The transfer unit 10 comprises a charger 12 for charging a photoreceptor material on the circumferential surface of the photoconductive drum 11 with electricity, the laser scanning unit 13 for exposing light to the photoconductive drum 11, a developing unit 14 for sticking toner to the latent image formed on the photoconductive drum 11, a transfer charger 15 for charging the recording sheet FP with electricity to cause a toner image to be transferred to the recording sheet FP, a cleaning unit 16 for removing the residual toner on the drum, and a discharging LED 17 for totally exposing the photoconductive drum 11 to light so as to remove the charge thereon. The exposure position and the transfer position on the circumferential surface of the photoconductive drum 11 are spaced from each other by 1.5 inches.

The photoconductive drum 11 should be exchanged after being used for printing a certain number of pages, since it will deteriorate in its properties and fail to ensure clear printing. For example, a limit of use is set at approximately 20,000 pages. The number of printed pages are electrically counted and recorded in a counter by a control system which is described later. This counter is reset when an upper cover UC is shut after a new photoconductive drum 11 is installed.

An outwardly protruding projection (not shown) is provided on a new photoconductive drum 11. As the projection presses down a reset switch (not shown) on the body side, the control system can detect that the new photoconductive drum 11 is placed in position. The projection retracts when the operation is started and an indication of the new drum disappears. The control system resets the counter when the upper cover UC is shut after the reset switch is turned on.

The laser scanning unit 13, which is secured in the upper cover UC, continuously deflects ON/OFF-modulated beams from a semiconductor laser (not shown) by means of a polygon mirror 13a. The laser beams are converged by means of an fθ lens (not shown), reflected by a beam bender 13b so that scanning lines are formed on the photoconductive drum 11. Then, an electrostatic latent image on a dot basis is formed as the drum rotates.

The developing unit 14 comprises a toner case 14a in which toner is accumulated, a developing roller 14b for sticking the toner onto the circumferential surface of the photoconductive drum 11 provided at the lower end of the case 14a, and a piezoelectric sensor, as a toner low sensor 14c, for detecting the presence or absence of the toner in the case 14a.

In normal text printing, the printing of letters is started from the left-hand side of paper so that frequency of use of toner normally tends to become high in a portion corresponding to the left-hand side of the paper. For this reason, the toner low sensor 14c is provided in the portion corresponding to the left-hand side of the paper where the toner consumption is large.

The transfer charger 15 is secured to an arm 15a which can be rotated by a cam mechanism around a pivot shaft L1. Moreover, a pair of guide rollers 18a, 18b are integrally secured to the arm 15a, the guide rollers 18a, 18b being laterally positioned so that the continuous form recording sheet FP is nipped therebetween.

When printing is started, it is necessary to idly rotate the photoconductive drum 11 without feeding the recording sheet until the exposed portion of the photoconductive drum 11 is located at the transfer position. In this case, the arm 15a is moved down to lower the guide rollers 18a, 18b, and accordingly, the recording sheet FP is retracted from the circumferential surface of the photoconductive drum 11. The life of the photoreceptor material is thus prevented from being shortened because of wearing. In addition, the paper is also prevented from being soiled by residual toner on the photoconductive drum 11.

An opening is formed on the transfer charger 15. The opening of the transfer charger 15 is arranged so that its rearward half, in the feeding direction of the recording sheet FP, is covered with a Mylar film 15b, and the discharging area of the transfer charger 15, which is uncovered, is arranged at the upstream side, in the rotational direction of the photoconductive drum 11, with respect to the contact portion between the photoconductive drum 11 and the recording sheet FP.

Conventionally, the whole opening of a transfer charger has been left open for charging. With such a setting, however, transfer efficiency tends to considerably vary as ambient humidity changes.

By narrowing the discharge area, corona discharge efficiency can be increased to prevent toner from being reversely charged under the influence of the corona discharge. Moreover, the period of time in which the recording sheet FP contacts the photoconductive drum 11 under pressure, after toner image is transferred thereto, can be set longer than that of conventional printers. As a result, transfer efficiency in the whole humidity range can be significantly improved. Experiments show that the transfer efficiency is improved to a great extent, especially when humidity is low. It is also possible to arrange the transfer charger 15 itself in the upstream side in the sheet feed direction in order to prolong the period of time for applying pressure after transfer.

Figure 2:
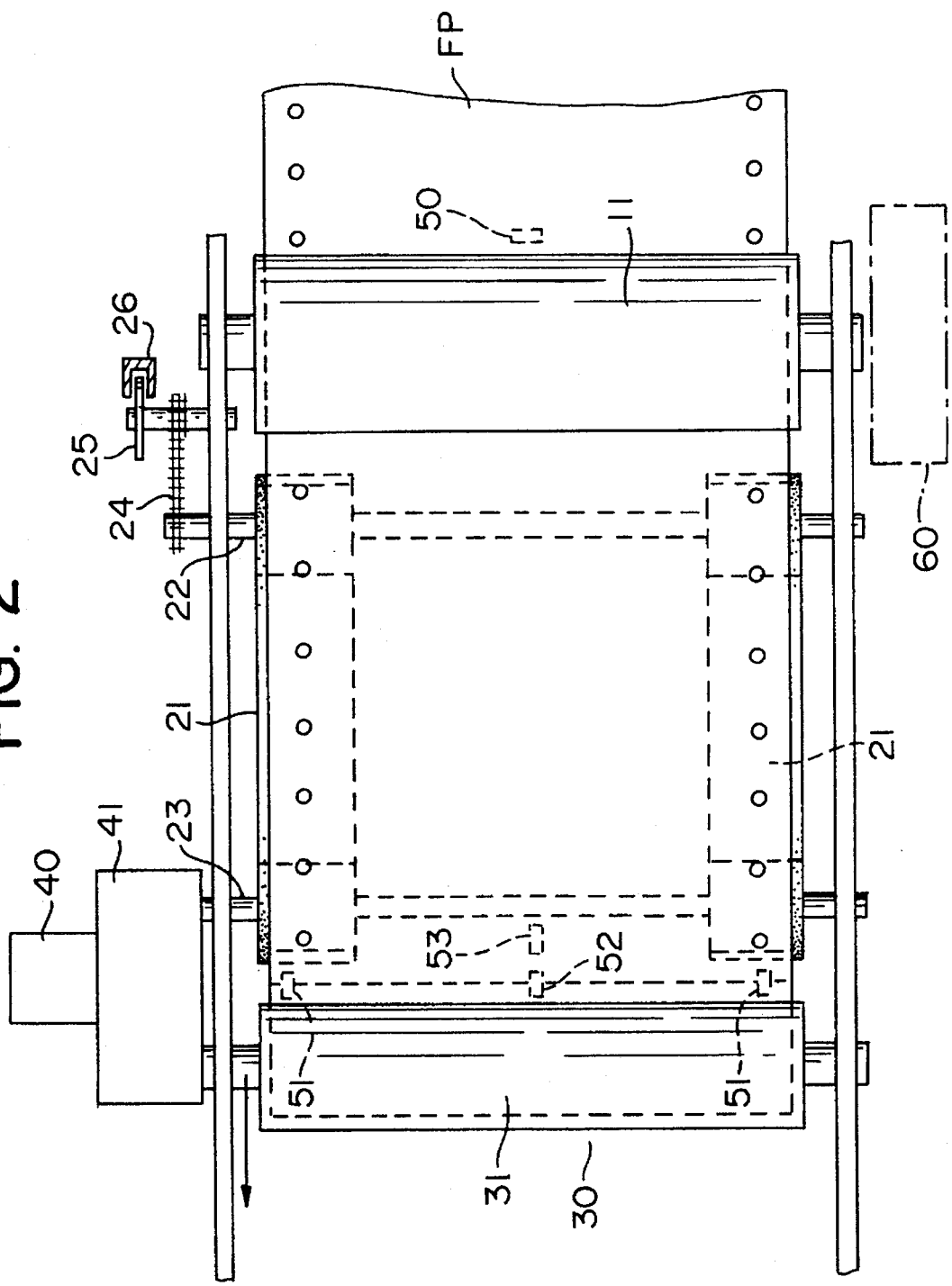
FIG. 2 is a top view of the paper conveying portion of a printer of FIG. 1.

The toner sticking to the photoconductive drum 11 is not totally removed therefrom after the termination of the transferring process. As the residual toner is unnecessary for the next printing, it is removed by a cleaning unit 16. The waste toner thus removed is stored in a waste toner box 60, which is detachably fitted to the side of the photoconductive drum 11 as shown in FIG. 2.

When a certain amount of waste toner is accumulated in the waste toner box 60, it overflows into the printer unless it is discarded. The waste toner may soil the inside if printing is started without the waste toner box 60.

In conventional printers, sensors have been used to respectively detect the presence or absence of such a waste toner box 60 and the full condition of the waste toner box 60. The problem is that the plurality of sensors thus required tends to complicate the control system.

In the printer according to the present embodiment, only one sensor is used to detect both conditions.

Figure 3:
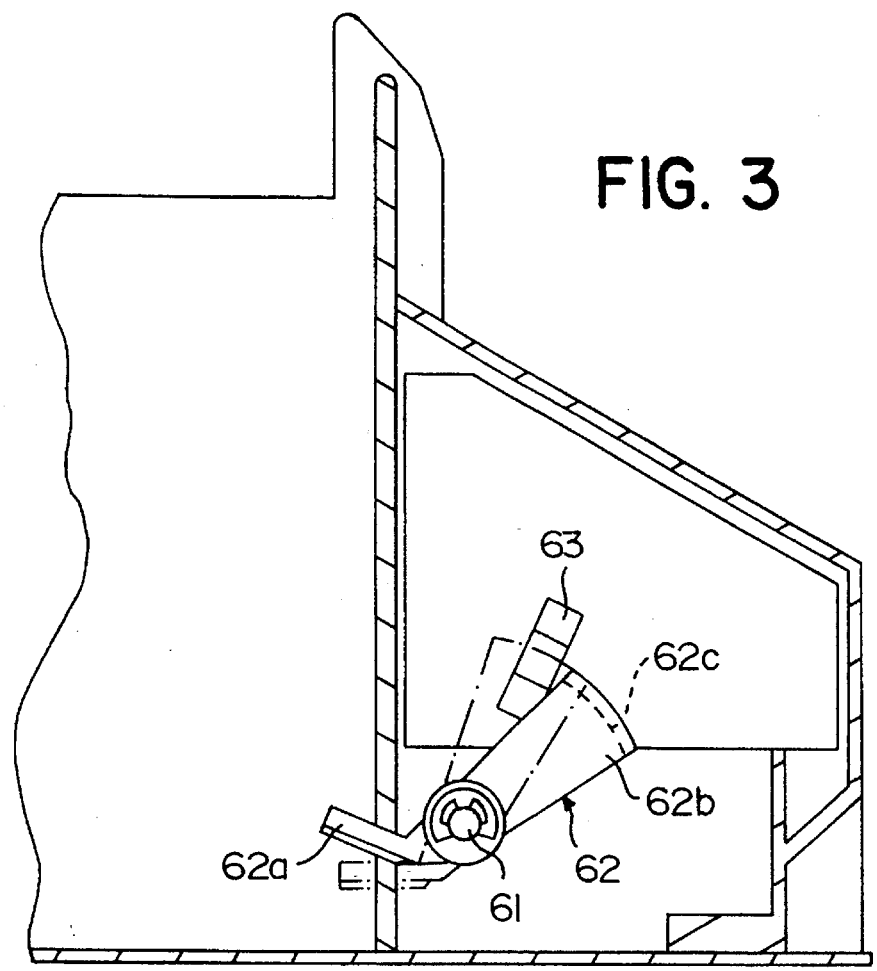
FIGS. 3 and 4 are side views of the waste toner sensor.

FIG. 3 illustrates the detecting mechanism. The waste toner box 60 is movably inserted along the guide of the body, the waste toner box 60 being vertically movable. An actuator 62 is rotatably pivoted with a fulcrum 61 on the body such that a contact portion 62a is located at a position where the bottom side of the waste toner box 60 is located. A fan-shaped portion 62b is provided at the other end of the rod 62, and a light-shading wall 62c is formed on the arcuate peripheral edge of the fan-shaped portion. The light-shading wall 62c is capable of crossing the space between a light receiving element and a light emitting element of a photo-interrupter 63.

If the waste toner box is not attached, the rod 62 is caused to revolve clockwise by its own weight as shown by a continuous line of FIG. 3, so that its contact portion 62a ascends and the light-shading wall 62c is located under the photo-interrupter 63. In this state, the photo-interrupter 63 produces a signal indicating that no rays of light are shaded, and the control system determines if an error relating to the waste toner box 60 has occurred.

When the waste toner box 60 is attached, the contact portion 62a is forced down by the weight of the box, and the rod is revolved counter-clockwise up to a substantially horizontal position, as shown by a broken line in FIG. 3. The light-shading wall 62c is thus set in a position where it screens the photo-interrupter 63. In this state, the photo-interrupter produces a signal indicating that the rays of light are shaded and the control system determines if an error relating to the waste toner box 60 has occurred.

Figure 4:
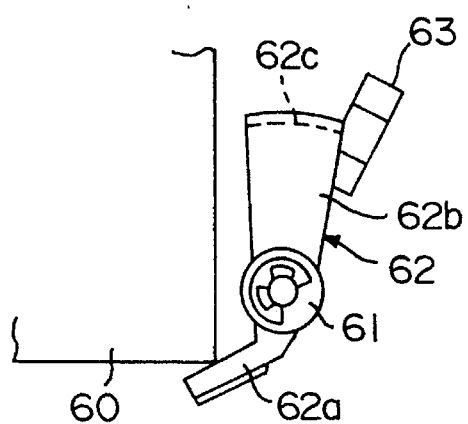

When the waste toner box 60 is filled with the waste toner, the contact portion of the rod is caused to descend due to the weight of accumulated toner, as shown in FIG. 4, and the light-shading wall 62c moves up to the left-hand side of the photo-interrupter 63. In this state, the control system determines again that an error relating to the waste toner box 60 has occurred.

In this way, one sensor can be used to detect that the waste toner box 60 is not installed and that the waste toner box 60 is filled with the waste toner. Although this sensor is so arranged as to monitor the presence or absence of the waste toner box and the amount of waste toner from the balance in weight between the rod 62 and the waste toner box 60, it is possible to employ a spring or the like to hold the balance as well as the dead load of the rod 62.

The tractor unit 20 is arranged so that, as shown in FIG. 2, the two endless belts 21, 21, which are stretched between a driving shaft 22 and a driven shaft 23, are driven by the main motor 40 via a field clutch (not shown, hereinafter called the F clutch) and a gear train (not shown) provided in a box 41.

The gear train extending from the main motor 40 up to the drive shaft 23 in the tractor unit 20 is arranged so that the continuous recording sheet FP is fed at the velocity of 50 mm/sec. if the tractor unit 20 is independently feeding the recording sheet FP. Moreover, the gear train contains a unidirectional clutch which races with a predetermined resistance in compliance with a tension when the paper is drawn at a rate higher than 50 mm/sec. to prevent the paper from overdriving the motor 40.

Figure 5:
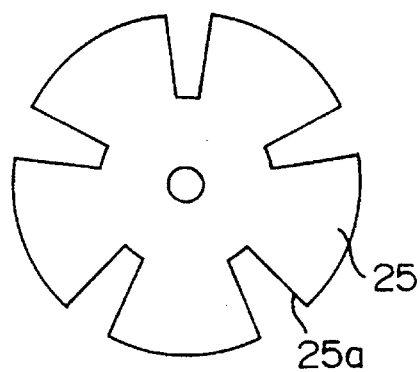
FIG. 5 shows a disc for use in generating PFS pulses.

The driven shaft 22 is connected with a disc 25 via a chain 24. The disc 25 is rotatable in response to the rotation of the driven shaft 22. As shown in FIG. 5, the disc 25 is provided with slits 25a which are spaced from each other by a predetermined space. The disc 25 is nipped between the light emitting member and the light receiving member of the photo-interrupter 26, and a pulse corresponding to the moved amount of recording sheet FP is obtainable. The photo-interrupter 26 is hereinafter called the PFS (Paper Feed Sensor) with its output being a PFS pulse.

The PFS pulse is outputted such that when the recording sheet is fed by ½ inch, one pulse is outputted. Further, the signal corresponding to the slit portion 25a and the signal corresponding to the portion other than the slit 25a correspond to the perforated lines of the continuous recording sheet FP and the non-perforated portion, respectively.

The positional relationship between the disc 25 for use in generating the PFS pulse, and a base plate on which the photo-interrupter 26 is mounted, may not be the same in individual printers because of assembly errors. If the slits 25a formed in the disc 25 are rectangular along the radius, the pulse width thus outputted may vary depending on where the photo-interrupter 26 has detected the slits 26a in the radial direction of the disc 25, and depending on when the relative position between the disc 25 and the photo-interrupter 26 radially shifts.

As this printer is arranged so that the paper feed error is judged from the detection of the PFS pulse, the variation of the pulse width may result in misjudgment of the error.

For this reason, the slit 25a formed in the disc 25 is fan-shaped so that its width gradually increases toward the circumference. In the other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing the misjudgment of the error. In addition, the assembly precision required is eased and hence assembly and workability is improved.

Sensors for detecting paper errors will subsequently be described.

In a conventional laser printer using cut sheets, two sensors are provided along a sheet feed path to detect the jamming of a recording sheet. Paper errors are detected when the sheet does not pass the downstream side sensor a predetermined time after it passed the upstream side sensor. Since there are no breaks in the continuous recording sheet, the aforementioned method of detection cannot be utilized in a printer using a continuous recording sheet.

In this printer 100, there are provided four kinds of sensors for detecting the presence or absence of the paper along the sheet feed path. The sheet empty and paper jamming conditions are detected by detecting the changing of sheet feed speed and the lifting up of the sheet.

The first sensor is an empty sensor 50 provided between the feed port 1 and the transfer unit 10. This printer 100 does not print on the portions adjacent to the perforated lines, which are used as a break between pages. The perforated lines are located right under the photoconductive drum 11 of the transfer unit 10 and at the position of the fixing rollers 31, 32 when printing is stopped in printer 100. The sheet empty condition can be detected from the output of the empty sensor 50 when the last page of the recording sheet FP is located in the printer. Moreover, it is detectable by counting the PFS pulses, which portions of the recording sheet are positioned at the transfer unit 10, at the fixing unit 30, and further at the empty sensor. Consequently, the counting of the PFS pulse and the output of the empty sensor 50 can be used to detect the recording sheet FP being torn off at a non-perforated portion.

The second sensors comprise skew sensors 51, 51 provided between the fixing unit 30 and the tractor unit 20. The skew sensors 51, 51 are used for detecting the skew and cutting-off of the continuous recording sheet FP. The sensors 51, 51 are capable of detecting the sheet when at least one side thereof lifts up.

The third sensor is a top sensor 52 provided in the central part between the skew sensors 51, 51. The top sensor 52 is used for detecting the leading end of the paper when the printing is started. After a predetermined number of pulses have been counted after the leading end of the recording sheet FP passes the top sensor 52, the leading end thereof reaches the fixing unit 30, whereas the following perforations are positioned at the transfer unit 10.

The fourth sensor is a jam sensor 53 provided in the upper cover UC, substantially opposite to the top sensor 52, with the sheet feed path therebetween. The jam sensor 53 is used for detecting the sheet when the sheet is jammed in the fixing unit 30, and when the central part of the recording sheet swells out to contact the jam sensor 53.

The fixing unit 30 comprises a heat roller 31 provided in the upper portion of FIG. 1, and a press roller 32. The continuous recording sheet FP is nipped between the rollers 31, 32, and is pressed against the heat roller 31 by the press roller 32 with a predetermined pressure. In the heat roller 31, a heating halogen lamp, and a thermistor for temperature detection, are provided.

The heat roller 31 is driven by the main motor 40 to rotate via the F clutch and the gear train and arranged so that, when the continuous recording sheet FP is held between the rollers 31, 32, it is fed at the speed of 75 mm/sec. As a result, the continuous recording sheet FP is actually driven in the fixing unit 30, whereas the tractor unit 20 mainly functions to prevent skewing of the continuous recording sheet FP.

If the continuous recording sheet FP is kept pressed against the heat roller 31 while printing is in a standby state, the paper may be scorched with the heat of the heat roller 31. In order to avoid the scorching of the sheet, in printer 100, the press roller 32 facing the heat roller 31 is made vertically movable so that the continuous sheet is retracted from the heat roller 31 while printing is in a standby state.

In the meantime, the rocking of the press roller 32 and that of the transfer charger 15 are implemented by the same drive means.

Figure 6:
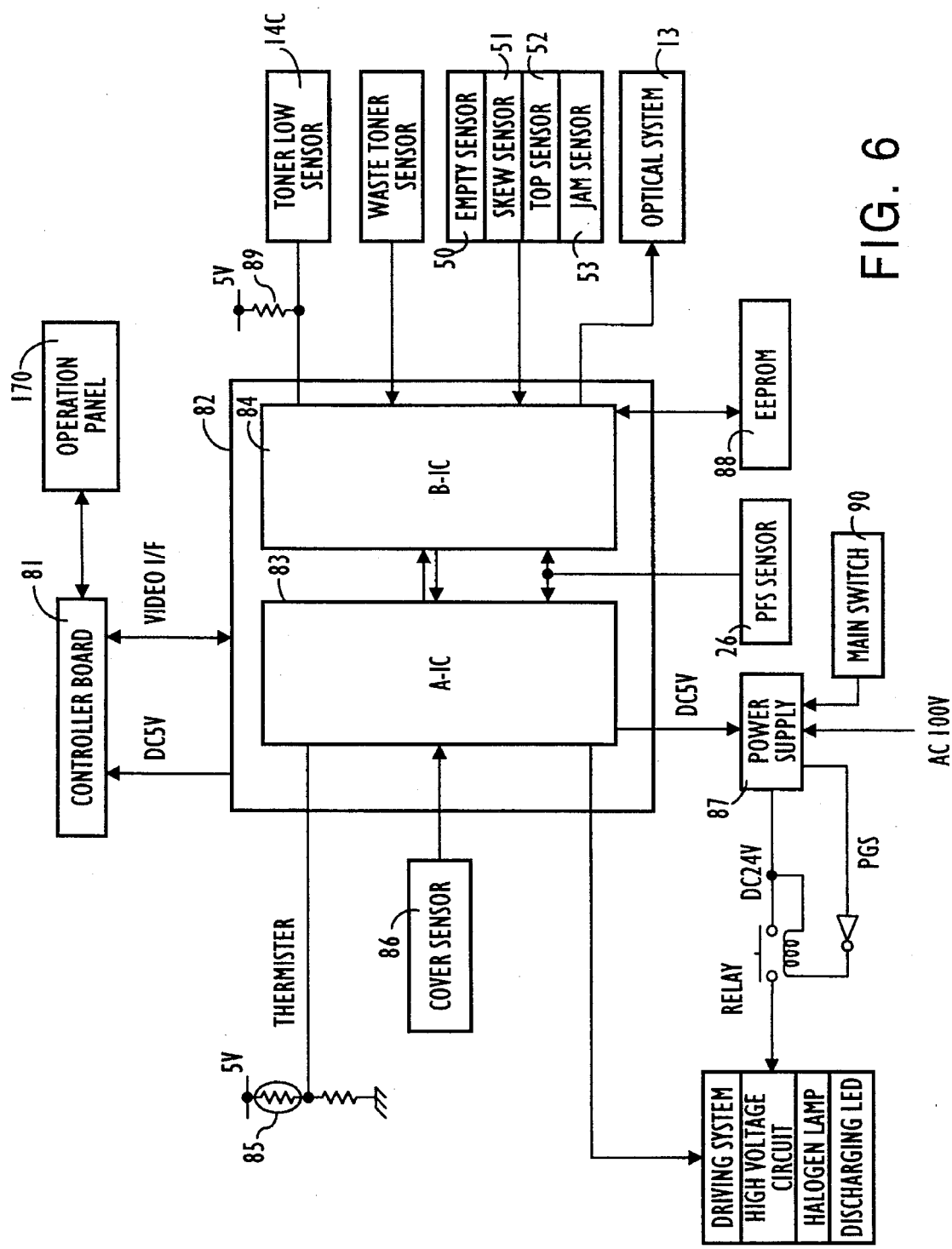
FIG. 6 is a block diagram illustrating a control system in the printer of FIG. 1.

FIG. 6 shows a control circuit of the printer.

This circuit comprises an operation panel 170 on which various switches and a display panel are provided, a controller 81 for developing the printing data received from a host computer into a map on a dot basis and outputting the map, and a driver 82 comprising two CPU's, one of which is an A-IC 83 for mainly controlling printing, and the other of which is a B-IC 84, mainly for error detection.

Although the selection of the page length is made by referring to a selection menu on the operation panel 170, the paper length may be set directly on the driver board 82 by means of DIP switches or the like. In this case, one signal line may be usable for selecting more than one paper length by converting the outputs of the plurality of DIP switches into analog values using a D/A converter, and thereafter inputting the results to the driver board 82.

The controller 81 is provided with a buffer which is capable of developing printing data corresponding to six pages of the recording sheet. New data is successively written to the buffer from time to time as the data is transferred to the driver.

The controller 81 and the driver 82 are connected via a video interface (video I/F) for transferring printing data, and a command line for transmitting various data.

The A-IC 83 is connected with a high voltage circuit, to which biases for the charger 12 and the like in the transfer unit 10 are connected. Further, a drive system, including the main motor 40, the F clutch 41, and the halogen lamp in the heat roller 31 are connected to the A-IC to be controlled.

A thermistor 85 for detecting the temperature of the heat roller 31, a cover sensor 86 for detecting the opening and closing of the upper cover UC, and the PFS sensor (or photo-interrupter) 26 are connected to the A-IC as the sensors for supplying data to the A-IC.

The heat roller 31 is so controlled as to have high temperatures as fixing temperatures only during printing, and low temperatures as standby temperatures when the printer is in a standby state to save power and to prevent the printer temperature from rising.

Power is supplied to the halogen lamp provided in the heat roller 31 as a heat source from the power supply 87, for supplying 100 volts a.c. The power supply is turned ON/OFF by a signal from the A-IC 83. The A-IC 83 receives an analog output from the thermistor provided adjacent to the heat roller 31, and executes A/D conversion so as to execute temperature control.

Figure 7:
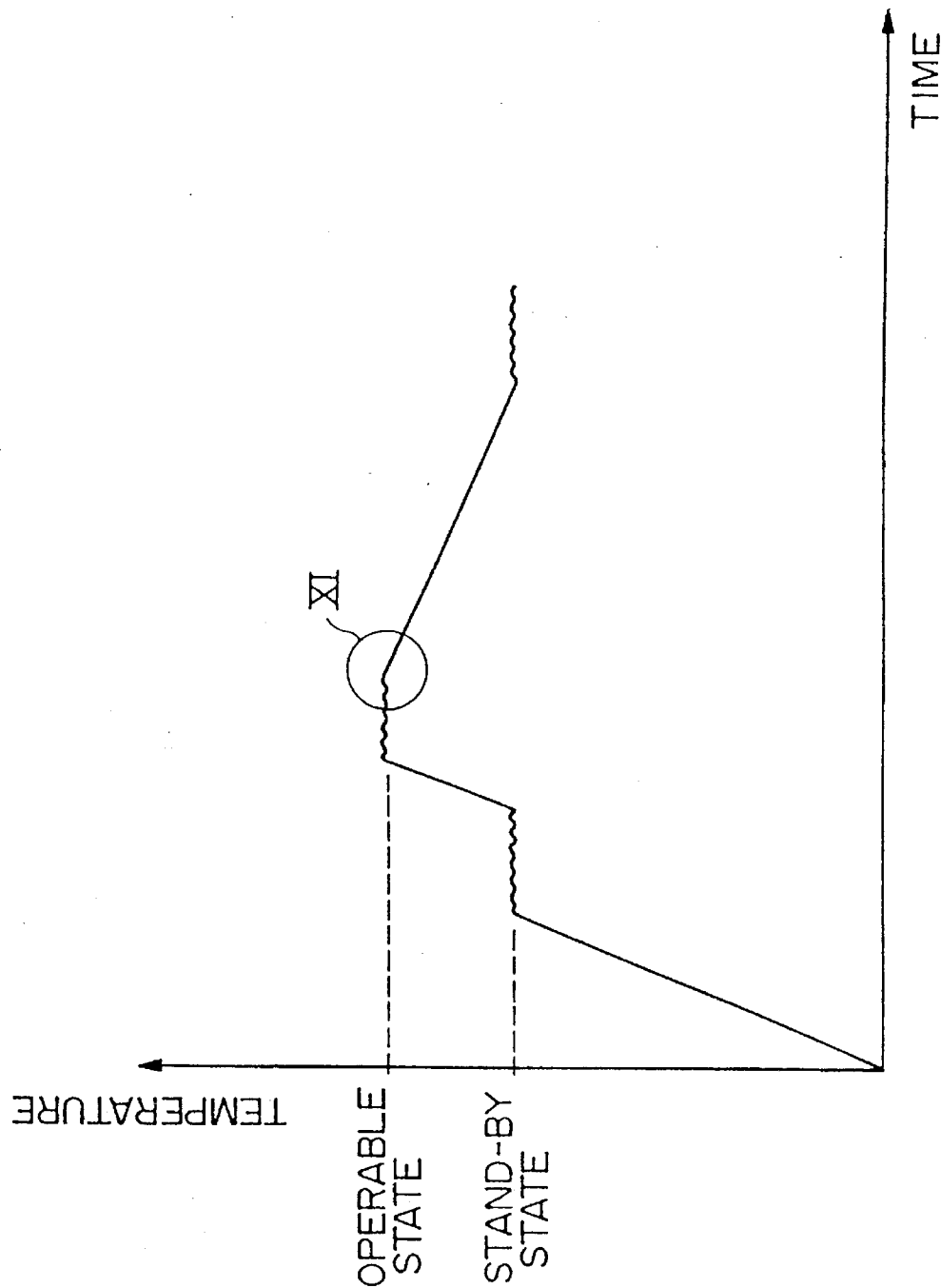
FIGS. 7 and 8 are graphs illustrating temperature control of the heat roller for the printer of FIG. 1.

The temperature control is effected with an allowance of approximately ±5 degrees. As a result, the actual temperature of the heat roller 31 fluctuates within upper and lower limits, as shown in FIG. 7. Accordingly, the difference in time required to lower the temperature to a certain value occurs depending upon the actual temperature of the heat roller 31. If the actual temperature of the heat roller 31 is at the upper limit of the fixing temperature, the time required to lower the temperature to the certain temperature value is relatively long; while, if the actual temperature is at the lower limit of the fixing temperature, the time is relatively short. In another aspect, the temperature of the heat roller 31, after a predetermined time has passed, differs depending upon the temperature of the heat roller 31 when the temperature began to be lowered. It is obvious that more warm-up time will be required to raise the temperature of the heat roller 31 to an operable (fixing) temperature from a lower temperature than a higher temperature.

Figure 8:
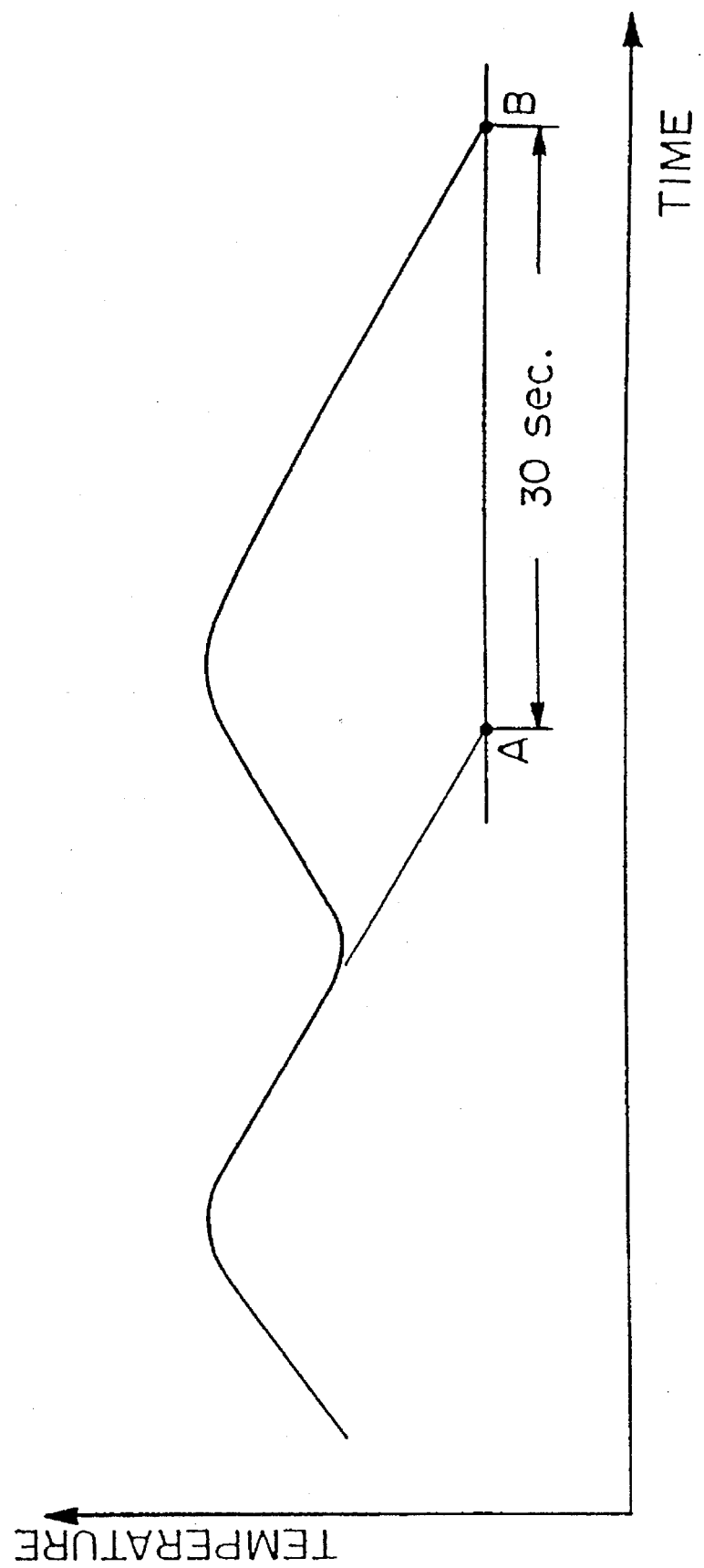

FIG. 8 shows the difference between two cases when the temperature of the heat roller 31 is lowered to a predetermined temperature set between the fixing and the standby temperatures. A point A shows a point where the temperature is lowered to a predetermined temperature which is lowered from the lower limit of the fixing temperature, and a point B shows a point where the temperature is lowered to a predetermined temperature which is raised to the upper limit, then lowered from the upper limit. In this example, there are approximately 30 seconds between the two points A and B.

In the printer of this embodiment, when the temperature is lowered from the fixing temperature to the standby temperature, the temperature is raised up to the upper limit of the fixing temperature before being lowered. In this way, the temperature is prevented from being lowered from the relatively low temperature within the fixing temperature so that the warm-up time required to raise the temperature up to the fixing temperature again can be shortened.

The B-IC 84 is connected with a semiconductor laser of the laser scanning unit 13 and an EEPROM 88 for storing printer life data.

As to means for inputting data to the B-IC 84, the empty sensor 50, the skew sensor 51, the top sensor 52 and the jam sensor 53 are connected to the B-IC 84 which are concerned with the paper feeding. In addition, the B-IC 84 is connected with the waste toner sensor for warning of the presence or absence of the waste toner box 60 and the amount of accumulated waste toner, and the toner low sensor 14c for warning of the shortage of toner, which are provided in the transfer unit 10 as being concerned with toner.

As to the toner low sensor in a conventional laser printer, it is common practice to set the sensor to output a low level signal when no toner is detected. With this arrangement, however, the problem is that when the sensor is disconnected, the low level signal indicating the toner low condition cannot be detected. In other words, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state with use of a resistance 89 for receiving the signal in the pull-up state.

HIGH is thereby inputted to the B-IC 84 when toner low is detected by the sensor 14c, when disconnection occurs in the sensor system and when the developing unit 14 installed with the toner low sensor 14c is not attached to the printer 100. In other words, a number of symptoms can simultaneously be detected with one sensor 14c.

The toner low sensor 14c comprises the piezoelectric element incorporated in the bottom surface of the toner case 14a and it outputs a LOW level signal on sensing the pressure applied by the toner accommodated in the toner case 14a, and a HIGH level signal without such pressure.

When the toner is sufficiently stored in the toner case 14a, the toner is always placed on the piezoelectric element as the toner low sensor 14c, despite the operation of a scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept out of the toner low sensor 14c as the scraper 19 slowly rotates, thus causing alternative output of the LOW and HIGH signals. Monitoring the duty ratio of the output of the toner low sensor 14c, the B-IC 84 judges the amount of the toner to be low when the HIGH signal exceeds 80 percent.

As the toner is not supplied on the developing roller 14b by the scraper 19 immediately after power is supplied, the output of the toner low sensor in the first three seconds for two rotations of the scraper is ignored. After the elapse of the three seconds, the toner low sensor 14c starts monitoring. Misjudgment of low toner can thereby be prevented before the operation of the scraper 19 when power is supplied.

The A-IC 83 and the B-IC 84 control the printer 100 by exchanging data via a plurality of signal lines. From the B-IC 84 to the A-IC 83, transmitted are signals such as a signal indicating that the B-IC 84 is in a standby state, a STOP signal for immediately stopping the operation of each unit of the printer 100 when an emergency error occurs even if printing is being executed, and a PAUSE signal for stopping the operation of each unit after the predetermined operations when a less urgent error occurs.

On the other hand, error signals indicating errors in the drive system are transmitted from the A-IC 83 to the B-IC 84.

The B-IC 84 analyzes the error detected by itself and the errors transmitted from the A-IC 83 thereto, then determines their degree of emergency in accordance with predetermined standards. The B-IC 84 selects the STOP or PAUSE signal depending on the degree of emergency, and then transmits the signal to the A-IC 83. The less urgent errors are the errors of toner overflow, low toner and empty paper, while the other errors are treated as emergency errors.

Figure 9:
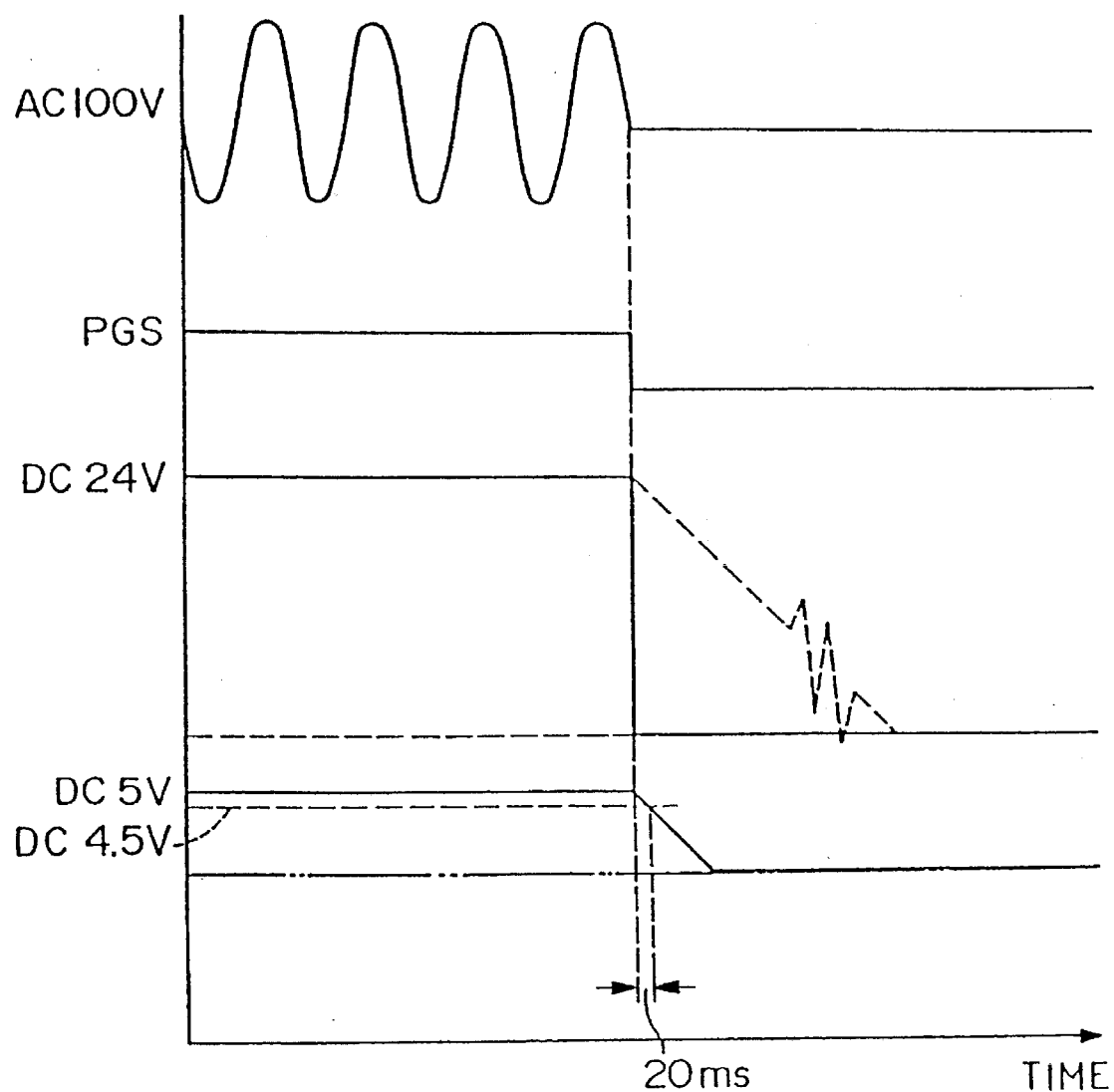
FIG. 9 is a graph illustrating power supply control of the printer of FIG. 1.

One hundred volts a.c. is applied to the printer, the control system being driven at 5 volts d.c., and the driving system such as a motor being driven at 24 volts d.c. When a main switch 90 of the printer 100 is turned off, the voltage gradually drops from 24 volts d.c. to ultimately 0 volts as shown by a broken line in FIG. 9.

The 5 volts d.c. power supply for the control system is so designed that more than 90 percent of the rated voltage (i.e., 4.5 volts d.c.) is held at least 20 msec. for storing data after the main power supply is turned off. This is because if the voltage becomes less than 90 percent of the rated voltage, the control system may fail to control the driving system.

As to the 24 volts d.c. power supply for the driving system, the voltage trends to fluctuate while it drops because of the operation of a protection circuit on the power supply side. Besides, if the control system does not operate as 5 volts d.c., it is cut off at that point in time, which may cause vibration of the motor, and, hence, malfunctions.

In this printer 100, the voltage applied to the driving system instantaneously drops from 24 volts d.c. to 0 volts on turning off the 100 volts a.c. main power supply 87 in order to prevent the aforementioned malfunctions. A relay is provided between the power supply and the driving system as a switch for the function stated above. The relay operates to cut off 24 volts d.c., either when a power good signal (POS) representing the ON/OFF of the main power 87 supply is cut off, or when the upper cover is opened.

By instantaneously dropping the voltage from 24 volts d.c. to 0 volts as above, the driving system is stopped while the control system functions with 5 volts d.c. being applied. Moreover, the fluctuation of the voltage is prevented while it is dropping. Consequently, the motor is prevented from vibrating and hence malfunctioning.

Laser printers are generally provided with a data recovery function for reprinting a blank page due to jamming or the like.

The printer 100 of this embodiment is designed to determine the number of pages to be reprinted (page data) in the driver according to the following errors: the paper jamming error and the paper empty error detected in a portion other than perforations or when the upper cover UC is opened during printing. Based on the number of pages, the controller 81 requests the host computer to transmit printing data to be reprinted.

The driver detects the page being printed at present according to the PFS pulses.

There are four kinds of page recovery data to be transmitted; namely, data "0" requiring no recovery, "1" requiring only one whole page which is being transferred to be reprinted, "2" requiring the page being transferred and the page which precedes that transferred to be reprinted, and "3", requiring the page being transferred and the preceding two pages to be reprinted.

When trouble occurs on the first page, the page data "1" is transmitted and the controller 81 requests the host computer for data on the page being printed, and transmits the data to the driver again after developing it on the buffer.

When trouble occurs on the second page, the third page or thereafter, the respective data is set at "2" or "3", and the controller 81 requests the host computer for data on the page to be reprinted.

When the opening of the upper cover UC is detected during printing of the third page, the page data is set at "1".

It may otherwise be arranged that the page data on reprinting is not determined by the page that has undergone trouble as stated above, but by the number of pages to be traced back, depending on the place where jamming has occurred.

FIGS. 10 (A and B) and 11 (A and B) show a flow chart illustrating the performance of a printer.

In this embodiment, the page length of the recording paper is 11 inches as aforementioned. Even if recording sheet having a page length of 12 inches is used, the printed area of each page is the same as that of 11 inches, and the remaining 1 inch of the page is used as a blank portion (non-printed portion) at the end of the printed area.

When the power switch is turned on, the printer 100 executes a self-test at step S.1 in order to detect an error of each unit in the printer 100. Disconnection of the thermistor, disorder of the main motor, the function of APC (Automatic Power Controller) for controlling the semiconductor laser, disorder of the polygon scanner, and the like, are detected.

When the self-test is terminated, warm-up of the heat roller 31 is executed at step S.2. In this step, the temperature of the heat roller is raised to a fixing temperature, which is the temperature necessary to perform the fixing procedure. If the temperature does not reach the fixing temperature within a predetermined period of time, it is determined that the heater is out of order.

Self-test and warm-up of the heat roller 31 is terminated, and it is determined (at step S.3) whether some errors are detected during the above procedure. If an error has been detected, the error procedure is executed. The error procedure includes displaying the kind of error detected, turning off the motor and the heater, and stopping the printer.

If no error is detected, at step S.4, the printer outputs a signal indicating the ready condition of the printer to a host computer (not shown), and waits for a request for printing. The request for printing is generated when data corresponding to more than one page is transmitted from the host computer. When the printing is required (step S.5), the following print sequence is executed.

The discharging LED 17 is turned on (step S.6), the main motor 40 and the polygon scanner 13a are actuated (steps S.7 and S.8), the output of the semiconductor laser is adjustably applied with APC (automatic power controller) (step S.9), and the charger 12 is turned on (step S.10).

Next, in steps S.11 and S.12, developing bias and cleaner bias are turned on. The press roller 32 is raised so that the recording sheet is nipped between the press roller 32 and the heat roller 31 at step S.13. At step S.14, a vertical synchronous signal is generated and the laser scanning unit 13 is actuated. In steps S.15 through S.17, a timer TET is set with the value corresponding to the page length of the recording sheet used. If the page length is 11 inches, 724 msec. is set to the timer TET, while if the length is 12 inches, 385 msec. is set. The page length is determined based on a flag FL which is set with the operation panel.

In step S.18, the procedure is paused until the time up of the timer TET. When the set period of time elapses, transfer bias is turned on (step S.19), the transfer unit is actuated, and the heat roller 32 and the tractor are rotated by use of the F clutch. The period of time set to the timer TET is calculated by subtracting a start up time for feeding the recording sheet from the time in which the portion of the photoconductive drum 11, which is exposed to the light from the laser scanning unit 13, reaches the transfer position. Further, if the page length of the sheet is 12 inches, the time for feeding the 1-inch blank portion at the end of the proceeding page is subtracted.

The start up time is a time for idly feeding the recording sheet when the sheet feeding is started. The recording sheet is idly fed in order to prevent the bad printing condition at the beginning of the sheet feeding. If sheet feeding is started (step S.20) at the point in time when the corresponding portion of the photoconductive drum 11 is located at the transfer position, the characters at the position may be deteriorated. Because the speed of the recording sheet cannot be the predetermined speed at the beginning of sheet feeding, there is a difference between the sheet feeding speed and the peripheral speed of the photoconductive drum 11. In order to prevent the occurrence of the speed difference stated above, feeding of the recording sheet is started with use of the F clutch (step S.21) so that the exposed portion of the photoconductive drum 11 is located after the recording sheet is fed by ⅙ inch. In other words, the portion ⅙ inches from the perforation line is a non-printing portion.

When the F clutch is turned on in step S.21, the PFS counter starts counting the PFS pulse. It should be noted that when the F clutch is turned on, if a recording sheet whose page length is 12 inches is used, the perforation line of the recording sheet is located on the upstream side of the transfer position by 1 inch. If the page length is 11 inches, the perforation line is located at the transfer position.

Figure 11A:
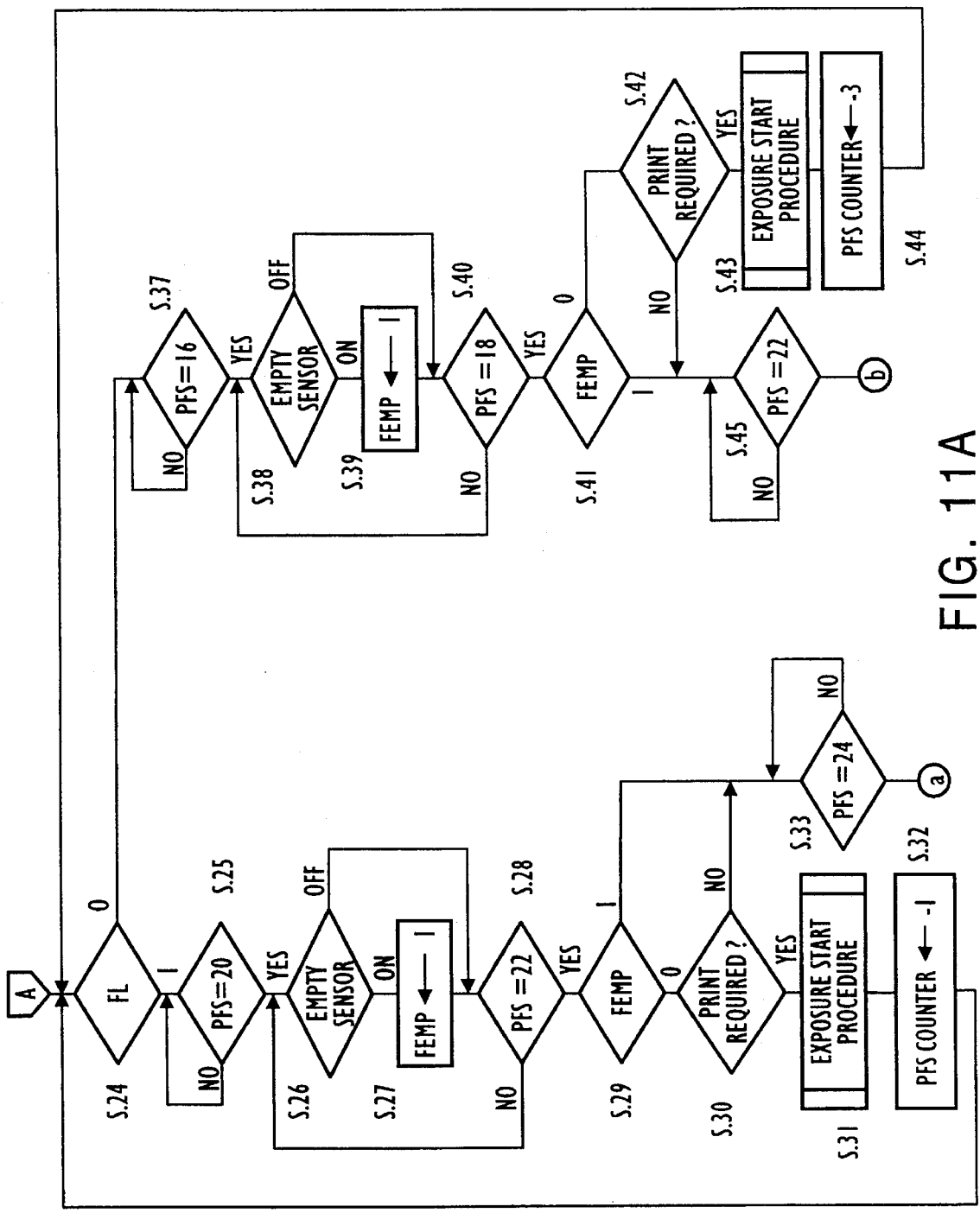
Figure 11B:
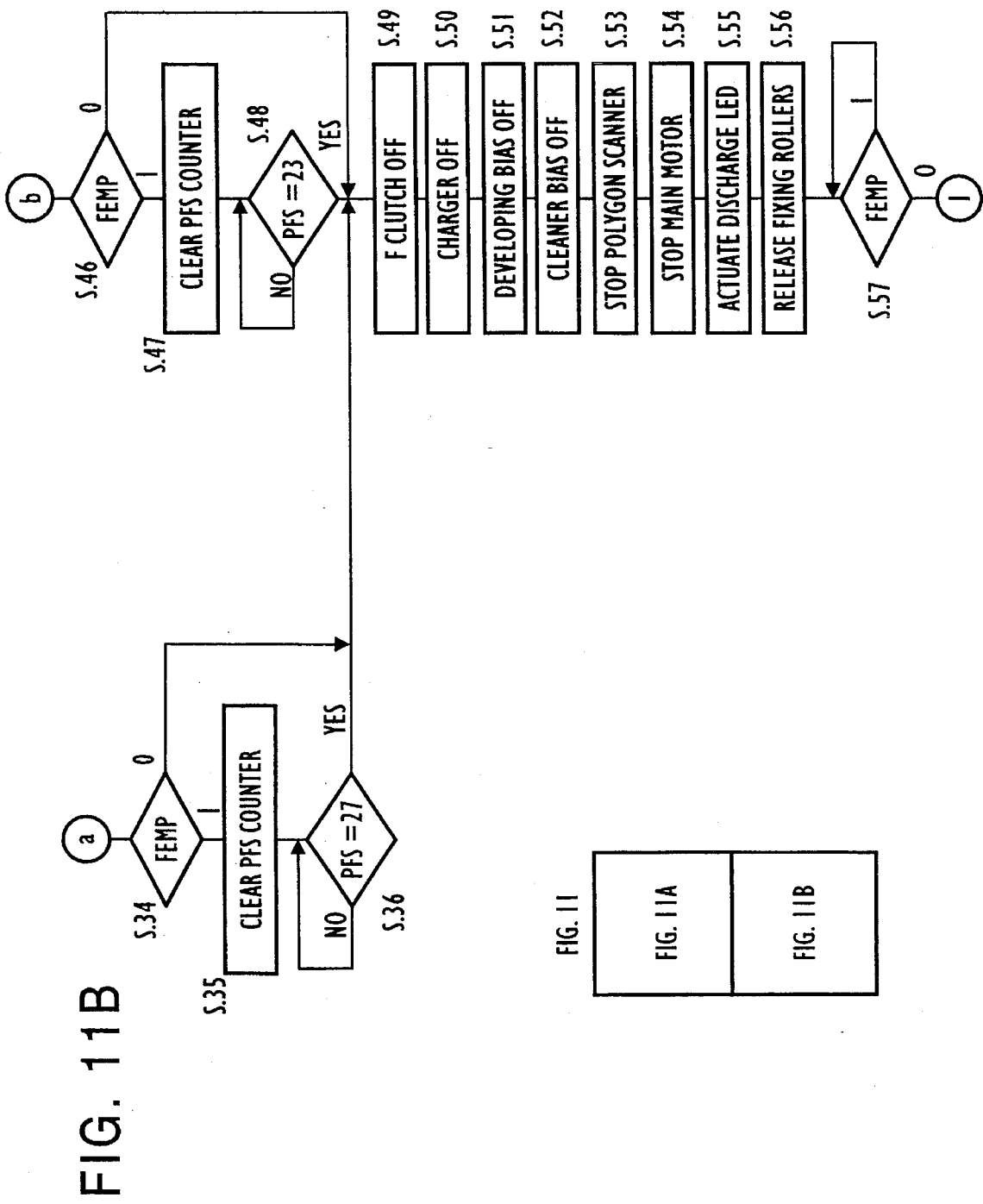

In steps S.22 and S.23, it is examined whether the PFS pulse is outputted within two seconds after the feeding of the recording sheet has been started. If the PFS pulse is detected, the process goes to step S.24 in FIG. 11. If the PFS pulse is not detected, the recording sheet is detected not to be fed and an error procedure is executed.

In step S.24, it is determined if the page length of the currently used recording sheet is 11 inches or 12 inches referring to the flag FL. If the page length is 12 inches, the procedure goes to steps S.25 through S.36. If it is 11 inches, the procedure goes to steps S.37 through S.48.

In steps S.25 through S.28, after the PFS pulse is counted up to 20 pulses, the output of the empty sensor is monitored until the PFS pulse is counted to 22 pulses. While the empty sensor is monitored, if the empty sensor is turned on, a flag FEMP is set to 1.

When the PFS pulse is counted up to 22, and if sheet empty is detected at step S.29 or printing the next page is not required (step S.30), the process goes to step S.33. If sheet empty is not detected and printing is required, the process goes to an exposure start procedure at step S.31, then the PFS counter is set to −1, and the process goes to step S.24. At the exposure start procedure, as shown in FIG. 12, the recording sheet FP is further fed by ½ inches before exposure is started. Controlled as above, the PFS counter counts 2 when the leading end of the succeeding page is located at the transfer portion.

When a recording sheet having a page length of 12 inches long is used, it is determined whether the printing of the succeeding page is required or not, after the sheet is fed by 11 inches. As aforesaid, the exposed portion of the photoconductive drum 11 does not correspond to the transfer portion of the recording sheet, when the portion ten inches from the leading end of the page is located at the transfer portion, the exposed portion of the photoconductive drum 11 corresponds to the portion a half inch inside the trailing end of the page. At this point in time it is determined whether printing of the succeeding page is required or not. If printing is required, the photoconductive drum 11 is exposed to the light, hereby the recording sheet and the photoconductive drum 11 can be continuously driven and printing can be continuously executed.

When printing is terminated, the PFS counter is set to 24 and it is determined whether sheet empty is detected or not, referring to the flag FEMP (steps S.33 through S.36). If sheet empty is not detected, the process goes to step S.49 and the F clutch is turned off. If sheet empty is detected, the PFS counter is cleared, and further, after the PFS counter counts up to 27, the process goes to step S.49. As operated above, when sheet empty is detected, the sheet bearing the transferred and unfixed toner image and remaining in the printer is discharged.

Since the page length of the recording sheet is 12 inches, which corresponds to the 24 counts of the PFS pulse, if sheet empty is detected, the sheet is fed by 27 counts of the PFS pulse for completely discharging the sheet.

If a sheet having a page length of 11 inches is used, the process goes to steps S.37 through S.48. In this case the process is similar to the case of using a sheet whose page length is 12 inches, other than counting of the PFS pulse. Namely, in this case, sheet empty is detected when the PFS counter counts 16, which corresponds to the portion of the sheet 8 inches from the leading end of the page, and the PFS counts 18, which corresponds to the portion of the sheet 9 inches from the leading end of the page. Further, the requirement of the printing of the succeeding page is detected when the sheet is fed 9 inches.

After the recording sheet is fed by 9 inches, when the counter counts the PFS pulse by 18 pulses, the portion of the photoconductive drum 11 corresponding to the portion ½ inch before the perforation line, which is a boundary between the currently printed page and the succeeding page, is located at the exposed position. When the recording sheet is located at the position as above, it is determined whether the printing of the next page is required or not. If printing is required, i.e., printing data is continuously inputted, printing is continuously executed. In this case, at step S.43, the recording sheet FP is fed by ½ inches before exposure is started (refer to FIG. 12).

In order to print the succeeding page, the PFS counter is set to −3 at step S.44 and the recording sheet is fed. Accordingly, the contents of the PFS counter is 0 when the leading end of the next page is located at the transfer position. If sheet empty is not detected, the F clutch is cut off without discharging the sheet carrying the unfixed toner image.

In steps S.50 through S.56, the charger, developing bias, and cleaner bias are turned off. Further, the polygon scanner 13a and the main motor are stopped, the discharging LED is turned off, and the fixing unit 30 is released.

In step S.57, the state of the flag FEMP is examined. If sheet empty is detected and printing is terminated, the process then pauses until the flag FEMP is set to 0 as the recording sheet is set and the empty sensor is turned off. If the printing is terminated because of no requirement of the printing, or the recording sheet is set and the empty sensor is turned off, the process goes to (1) in FIG. 10 and is paused until the printing is required.

In the above-mentioned embodiment, when the recording sheet having a page length of 12 inches is used, it is arranged that a blank space of one inch is collectively provided at the end of each page of the recording sheet. However, it is possible for the blank space to be provided at the head of each page of the recording sheet. Moreover, it is also possible to provide a blank space of ½ inch at the head and the end of each page of the recording sheet.

As above, according to the present invention, the exposed position of the photoconductive drum is changed according to the page length of the recording sheet, whereby a plurality of types of recording sheets having different page lengths, respectively, can be used without changing the mechanical construction of the printer.

Referring to FIGS. 13–17, another embodiment of the present invention will be described hereinafter.

FIG. 13 is a schematic diagram of a laser beam printer as an embodiment of an electrophotographic printer using a continuous-form sheet according to the present invention. The laser beam printer forms image or character information input from a computer and the like onto a fan-folded sheet 120, as a continuous-form recording sheet, by an electrophotographic method, and outputs the same as hard copy.

A photoconductive drum 101 is rotated at a predetermined peripheral speed, i.e., the moving speed of a circumferential surface thereof, by a main motor (not shown); and a toner cleaning unit 102, a charge removing unit 103, a charging unit 104, a scanning optical system 105 for introducing laser beams onto the photoconductive drum 101, a developing unit 106, and a transfer unit 107, are all disposed along the rotating direction of the photoconductive drum 101, around the circumference thereof.

Recording sheet feed paths 130 including 131, 132, which are arranged along the right and left directions in the drawing at the opposite sides of the transfer unit 107, and are disposed substantially beneath the photoconductive drum 101, and a tractor 109 is disposed at the recording paper feed path 131 on the introduction side, i.e., left side, and a fixing unit 108 is disposed at the recording sheet feed path 132 on the discharge side, i.e., right side (the side to which the fan-fold paper 120 is fed). Further, a plurality of recording sheet sensors 130P (sensor "P"), 130F (sensor "F"), and 130R (sensor "R"), each composed of a reflection type photo-sensor, are disposed along the recording sheet feed path 130 (the recording paper feed path 131 on the introduction side and the recording paper feed path 132 on the discharge side) on the introduction side of the tractor 109, between the photoconductive drum 101 and the tractor 109, and between the photoconductive drum 101 and the fixing unit 108, respectively.

The laser beam printer effects a main scanning (exposure) of the surface of the photoconductive drum 101 in the direction along the rotating axis thereof by laser beams from the scanning optical system 105, rotates the photoconductive drum 101 (auxiliary scanning), develops a latent image formed on the surface of the photoconductive drum 101 at the developing unit 106 to form a toner image, transfers the toner image at the transfer unit 107 onto the fan-folded sheet 120, which is fed through the recording sheet feed path 130 by the tractor 109, fixes the toner image onto the fan-folded sheet 120 using the fixing unit 108, and then discharges the fan-folded sheet 120.

The tractor 109 comprises two endless belts 191, 191 associated with each other, disposed in parallel, and having projections to be engaged with the feed holes defined along the opposite sides of the fan-folded sheet 120. One of the pulleys closely connecting both of the endless belts 191, 191 is connected to a drive motor 192, and thus the endless belts 191,191 are rotated forwardly and reversely by the drive motor 192.

Further, synchronously rotatably connected to the tractor 109 is an encoder 193 having a disc provided with a plurality of slits defined around the circumference thereof, in correspondence with the projections of the endless belts 191, 191, and thus the feeding speed of the fan-folded sheet 120 can be accurately determined. A photo interrupter is disposed with the circumference of the disc held therebetween; the components thereof sense the slits, and thus the feed speed of the fan-folded sheet 120 is directly determined without referring to the r.p.m. (revolutions per minute) of the drive motor 192.

The transfer unit 107 comprises a corona charging unit 171 having a length substantially the same as the width of the photoconductive drum 101, supported by an arm member 172 arranged to be rocked at the opposite ends thereof, and disposed in parallel with the photoconductive drum 101, at a predetermined distance from the circumferential surface. The corona charging unit 171 can be retracted from a transfer position confronting the photoconductive drum 101 by swinging the arm members 172 by a (not shown) drive mechanism.

The fixing unit 108 comprises a cylindrical heat roller 181 heated to a predetermined temperature by a heating element, such as a halogen lamp or the like inserted therein, and a backup roller 182, the heat roller 181 and the backup roller 182 being arranged as a pair of vertically aligned fixing rollers and disposed perpendicularly to the direction in which the fan-folded sheet 120 is fed.

The upper heat roller 181 is held by swingable levers 183 at the opposite ends thereof, and when the levers 183 are swung by a (not shown) swinging drive mechanism, the heat roller 181 is retracted upwardly from the fixing position and separated from the fan-folded sheet 120. In addition, the lower backup roller 182 is connected to a (not shown) drive means and driven by it at a peripheral speed substantially similar to the feed speed of the fan-folded paper 120 fed by the tractor 109.

A control unit 150 controls, as a whole, the rotation of the belts 191, 191, driven by the drive motor 192 (the feed of the fan-folded sheet 120 along the forward and reverse directions), the transfer action effected by the transfer unit 107 and the swinging retraction of the corona charging unit 171 thereof, the fixing action effected by the fixing unit 108 and the swinging retraction of the heat roller 181 thereof, and the processing units related to the electrophotographic method (the rotation of the photoconductive drum 101, the toner cleaning unit 102, the charge removing unit 103, the charging unit 104, the scanning optical system 105, and the developing unit 106, as illustrated in the block diagram of FIG. 13). Further, information is supplied to the control unit 150 from the encoder 193 associated with the belts 191, 191 and the recording sheet sensors 130F and 130R and information relating to an operation input from the panel 141 are respectively supplied to the control unit 150. Further, the control unit 150 is provided with a memory means 151 composed of a rewritable ROM (Read Only Memory) in which data such as sheet size, communication protocol, the number of sheets to be printed and the like, which are input by the operation of the panel 141, are stored. Further, the control unit 150 controls the laser beam printer to form image information supplied from a host computer 160 and stored in a (not shown) memory based on the input information. Note that, in the drawings, 142 designates an indicator unit composed of an indicating member, for example, an LCD (Liquid Crystal Display), for indicating the information relating to the occurrence of unacceptable conditions and the like to an operator.

Next, with reference to the flow chart shown in FIG. 16, the control operation effected by the control unit 150 of the laser beam printer, arranged as described above, will be described hereinafter.

First, the state of the fan-folded sheet 120 is sensed in response to sensing signals from the recording sheet sensors 130P, 130F and 130R. Note that the corona charging unit 171 of the transfer unit 107 and the heat roller 181 of the fixing unit 108 are in a swingingly retracted state at the time (S101, S102, S103).

When the sensor "P" is turned "OFF", that is, when the fan-folded sheet 120 is not detected, it is determined that the fan-folded sheet 120 is not inserted and the fan-folded sheet 120 is requested to be inserted by the indication of "NO SHEET" (S141).

Figure 15A:
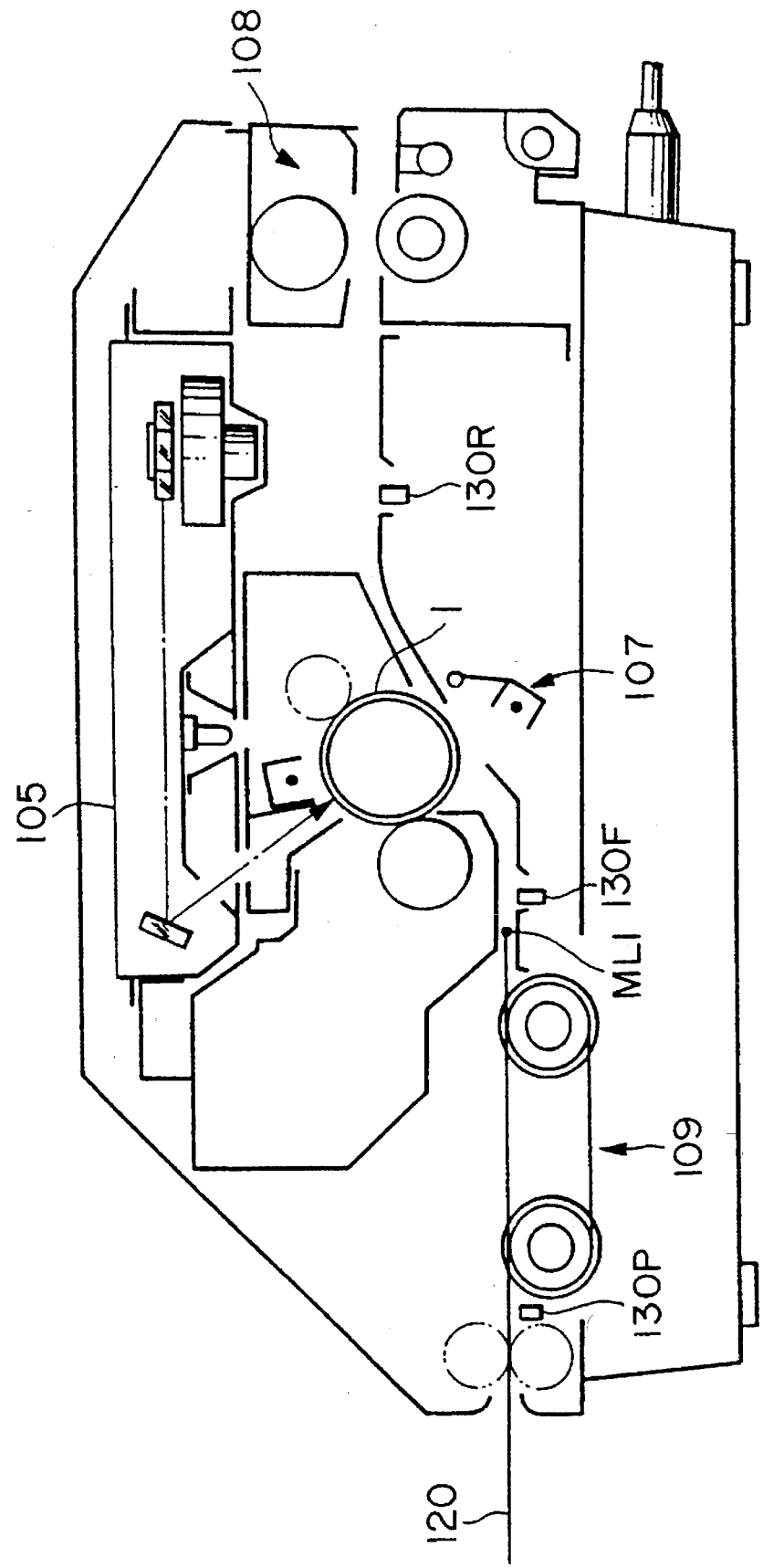
Figure 15C:
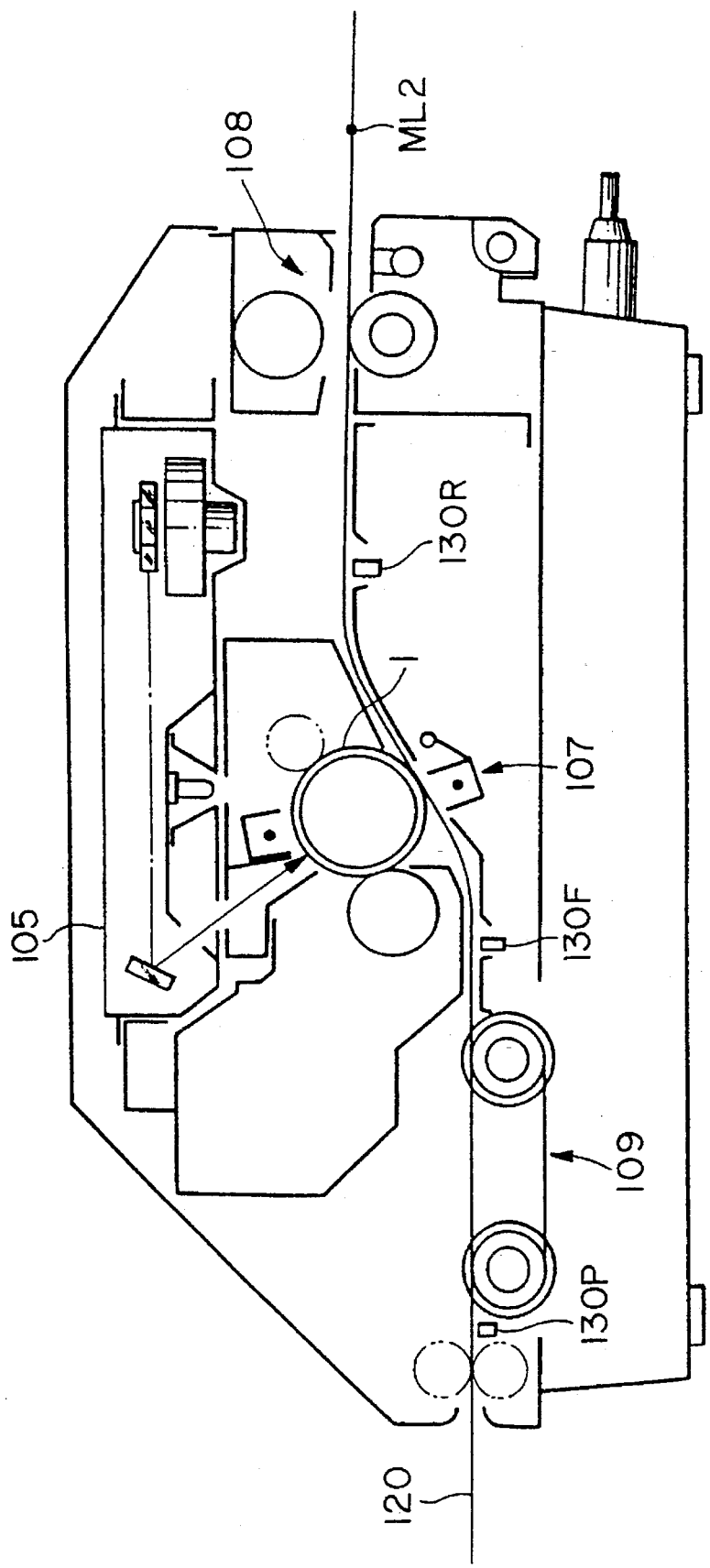
Figure 15D:
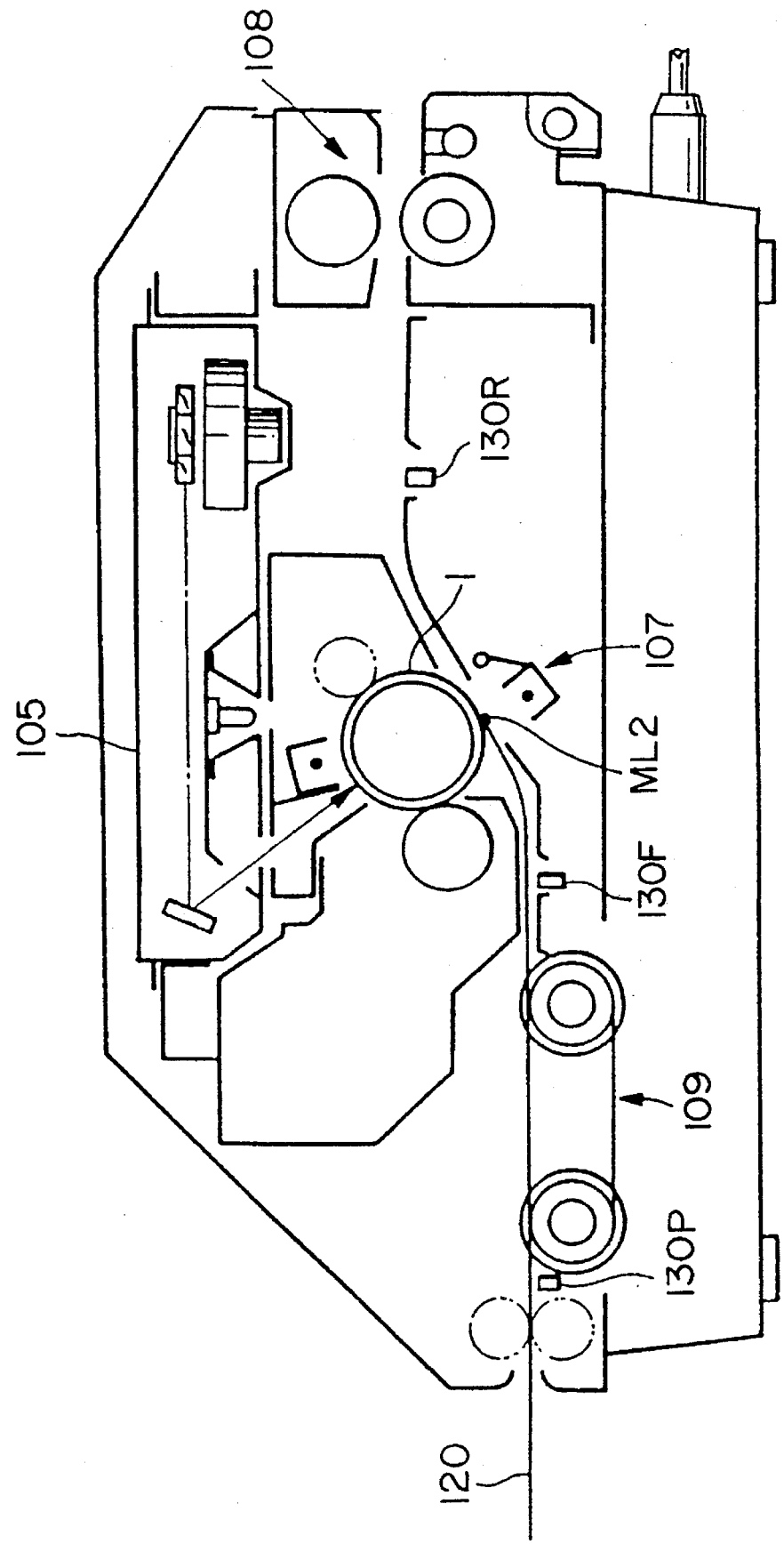

When the sensor "P" is turned "ON" and the sensor "F" is turned "OFF", it is determined that the fan-folded sheet 120 is set and thus the tractor 109 is driven to forward the fan-folded sheet 120, as shown in FIG. 15A (S131), and when the leading edge "MLl" thereof is located at a predetermined position corresponding to the transfer unit 107, the tractor 109 is stopped, as shown in FIG. 15B. FIG. 15B shows the output waiting state, wherein a preparation for outputting an image onto the recording sheet 120, has been completed. The fan-folded sheet 120 is set to the output waiting state in such a manner that the recording sheet sensor 130F senses the fan-fold paper 120 being fed (is turned "ON") to determine the position of the leading edge 'ML1" thereof and thereafter it is controlled, based on feed information from the encoder 193 (based on pulse signals in synchronism with the feed of the fan-folded sheet 120 applied from the encoder 193). More specifically, since the number of pulses N, which is necessary for the fan-folded sheet 120 to move to the output waiting state (once the leading edge "ML1" has been sensed by the recording sheet sensor 130F), is known in advance, the output waiting state can be correctly achieved in such a manner that when the recording sheet sensor 130F senses the leading edge of the fan-folded sheet 120 (S132), a count of pulses from the encoder 193 is begun (S133, S134), and when the number of pulses counted amounts to "N", the feed of the fan-folded sheet 120 is stopped (S135, S108). Although it is not described in detail, the feed of the fan-folded sheet 120 is hereinafter controlled based on feed information from the encoder 193, i.e., by counting the pulses. When the recording sensor 130F (sensor "F") is turned "ON", it is confirmed that the fan-folded sheet 120 has been loaded, and, next, when the recording sheet sensor 130R (sensor "R") is turned "ON", it is determined that the fan-folded sheet 120 is in an output completion state, shown in FIG. 15C, to be described later, and thus the tractor 109 is rotated reversely to retract the fan-folded sheet 120 (S104) until the output waiting state shown in FIG. 15D is achieved. That is, one page of the recording sheet is moved backwardly. The symbol 'ML2" in FIGS. 15C and 15D designates a leading edge of the succeeding page. The recording sheet 120 is cut at "ML2" when the sheet 120 reaches the output completion state shown in FIG. 15C. This rearward movement of one page is also controlled in such a manner that pulses from the encoder 193 are counted (S105, S106) and the reverse feed is stopped when the number of pulses counted amounts to the count; that is, "PC" corresponding to the number of pulses of the one page of the used fan-folded sheet 120 (S107, S108).

Here, the count "PC", corresponding to the one page of the fan-folded sheet 120, is set based on the sheet size input operation by means of the panel 141, and is stored in the memory 151. For example, in the present invention, since the encoder 193 is rotated in synchronism with the endless belts 191, 191 of the tractor 109, and the slits thereof are defined to correspond to the projections of the endless belts 191, 191 (i.e., they correspond to the feed holes of the fan-folded sheet 120 defined at an interval of ½ inch), a "PC" of the fan-folded sheet 120 having a distance between perforated tear lines set to 11 inches has 22 pulses, a "PC" of the fan-folded sheet 120 having a distance between perforated tear lines set to 12 inches has 24 pulses, and a "PC" of the fan-folded sheet 120 having a distance between perforated tear lines set to 13 inches has 26 pulses. With this arrangement, the printer is interchangeably applicable to fan-folded sheets 120 having a plurality of kinds of distances between perforated tear lines.

After the leading edge (ML1) of the fan-folded sheet 120 has reached the output waiting state corresponding to the transfer unit 107, the rotation of the photoconductive drum 1 and the exposure from the scanning optical system 105 are started (S109, S110). In addition, although it is not shown in FIG. 16, as the photoconductive drum 101 starts rotation, the toner cleaning unit 102, the charge removing unit 103, the charging unit 104 and the developing unit 106 begin their respective operations.

The forward movement of the fan-folded sheet 120, caused by driving of the tractor 109, the return of the corona charging unit 171 to the transfer position, and the transfer action thereof, are started in synchronism with the arrival of a portion of the photoconductive drum 101 to be exposed by the scanning optical system 105 at the transfer unit 107 which is caused by the rotation of the photoconductive drum 101 (S111, S112). As a result, a toner image on the surface of the photoconductive drum 101 is transferred onto the fan-folded sheet 120.

The heat roller 181 of the fixing unit 108 is swingingly turned in synchronism with the arrival of the portion of the fan-folded sheet 120 where the toner image is transferred from the photoconductive drum 101 at the fixing unit 108 caused by the forward movement of the fan-folded sheet 120, and fixing action starts (S113).

After one page has been exposed as described above, it is determined whether there is a succeeding page or not (S114, S115).

When there is a succeeding page, exposure thereto is started continuously (S116).

When there is no succeeding page, the operation of the transfer unit 107 is stopped and the corona charging unit 171 is swingingly retracted (S117) at the same timing as at the start of operation. Pulses from the encoder 193 are counted (S118, S119), the operation of the fixing unit 108 is stopped (including the swinging retraction of the heat roller 181) (S121) when the number of pulses counted amounts to the count "PC" corresponding to the one page of the fan-folded sheet 120 (S120), and the drive of the tractor 109 is stopped to interrupt the feeding of the fan-folded sheet 120. This state is shown as an output completion state in FIG. 15C.

When image formation has been completed for one page, the leading edge of the page next to the page on which an image has been formed is in the output waiting state, when it is observed based on the leading edge of the image-formed page, and thus when the fan-folded sheet 120 is fed an amount corresponding to the count PC corresponding to one page (i.e., the length of one page), the image formed-page is fed forwardly of the fixing position of the fixing unit 108 (this is because the recording paper feed length from the transfer position of the transfer unit 107 to the fixing position of the fixing unit 108 is set shorter than the distance between the perforated tear lines of the fan-folded sheet 120). The image-formed page is securely subjected to a fixing action, and the position of the perforated tear line between the image-formed page and the leading edge of the next page is sufficiently projected externally of the laser beam printer so that cutting off the same along the perforated tear lines can be easily effected.

The fan-folded sheet 20, after an output operation, is cut off along the perforated tear line for use, and the leading edge "ML2" of the next page is formed by the cutting off operation. In the next image formation, the fan-folded sheet 120 is put in the output waiting state, as shown in FIG. 15D, by being fed reversely over a length corresponding to one page as described above (since the output completion state is achieved by feeding the fan-folded sheet 120 forwardly a length corresponding to one page from the output waiting state, the output waiting state is necessarily achieved by retracting it a length corresponding to the one page from the output completion state), and then image formation begins. Note that when the image-formed page is not cut off along the perforated tear line after the output has been completed, the image-formed page is pulled into the laser beam printer in the next output, which causes no problem since it has been already fixed by the fixing unit 108.

With the above-mentioned arrangement, the page on which the image is formed is securely fixed and discharged from the printer in the state that it can be cut off, and when the next output is carried out, the fan-folded sheet 120 is retracted so that an output can be carried out from the first page (the first page being formed by cutting off the previous page, or when the previous page is not cut off, the page next to the page on which the previous output was carried out). Therefore, the fan-folded sheet 120 is not wasted when the output begins, and, further, the length of the recording paper feed path, from the transfer unit to the fixing position of the fixing unit, can be set independently of the distance between the perforated tear lines of the fan-folded sheet 120, whereby the printer can be made small in size and applied to various kinds of recording sheets, respectively, having a different distance between perforated tear lines.

In the above embodiment, the distance between the photoconductive drum 101 and the pair of rollers is arranged to be less than an interval between the perforated tear lines t1 and t2, as illustrated on FIG. 17A, for making the total volume of the laser beam printer small. In this case, the trailing edge of the page on which the toner has been adhered is forwardly located with respect to the pair of rollers 181, 182, when the fan-folded sheet 120 is fed by an amount corresponding to one page. However, it may be considered that, as illustrated in FIGS. 17B and 17C, the distance between the drum 101 and the rollers 181, 182 is arranged to be substantially the same as, or to be larger than, the interval between t1 and t2 in connection with the factors involved in designing the laser beam printer. In these cases, the fan-folded sheet 120 is controlled so as to be fed in an amount larger than that corresponding to one page, after the toner adhesion operation has been executed by the photoconductive drum 101.

Although the invention has been described with reference to particular means, materials and embodiments, it is to be understood that the invention is not limited to the particulars disclosed and extends to all equivalents within the scope of the claims.

The present disclosure relates to subject matter contained in Japanese patent applications No. HEI-293,712 (filed on Nov. 10, 1989), and No. HEI 2-105,642 (filed on Apr. 20, 1990), both of which are expressly incorporated herein by reference in their entireties.

What is claimed is:

1. A continuous-form electrophotographic printer for printing a continuous-form composed of a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different from the sheet length B;

an image transfer device at the image transfer station for transferring electrophotographic images onto the individual sheets as the continuous-form is conveyed past the image transfer station;

an image fixing device at the image fixing station for fixing the transferred images to the individual sheets as the continuous-form is conveyed past the image fixing station; and printer control means operatively connected to the sheet feeding means having a sheet registration means that is responsive to at least stopping and restarting of movement of the continuous-form for (a) indexing the continuous-form relative to the image fixing station to register a portion of a sheet with the image fixing station when the continuous-form is stopped, and (b) indexing the continuous-form relative to the image transfer station to register a leading edge of a sheet with the image transfer station when movement of the continuous-form is restarted.

2. The continuous-form electrophotographic printer as defined in claim 1, wherein the image transfer device includes a photo conductor image transport with an image receiving surface and wherein the printer further comprises an image transfer drive means operatively connected to the photo conductor image transport for moving the image receiving surface in coordination with the movement of the continuous-form to transfer images to the registered sheets.

3. The continuous-form electrophotographic printer as defined in claim 2, wherein the printer control means is operatively connected to both the sheet feeding means and the image transfer drive means for normally moving the image receiving surface and the continuous-form in synchronization with each other while the images are being transferred to the sheets and for indexing the continuous-form relative to the image receiving surface when the continuous-form is being stopped and restarted.

4. The continuous-form electrophotographic printer of claim 1, wherein said sheet registration means is also responsive to the distances A and B.

5. The continuous-form electrophotographic printer of claim 1, wherein said portion is a leading portion of a sheet.

6. The continuous-form electrophotographic printer of claim 1, wherein said portion is a leading edge of a sheet.

7. The continuous-form electrophotographic printer of claim 5, wherein said sheet registration means is also responsive to the distances A and B.

8. The continuous-form electrophotographic printer as defined in claim 1, wherein the sheet registration means indexes the continuous-form forward a restarting distance D that is equal to the distance B minus the distance A, when distance A is less than distance B, to align a leading edge of a sheet at the image transfer station as the movement of the continuous-form is restarted.

9. A continuous-form electrophotographic printer in accordance with claim 1, wherein said sheet portion has no image transferred thereon.

10. A continuous form electrophotographic printer in accordance with claim 1, wherein said sheet registration means is also responsive to the distance B.

11. A continuous-form electrophotographic printer for printing on a continuous-form, in which the continuous-form comprises a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different than the sheet length B;

a rotatable image transfer drum at the image transfer station for receiving electrophotographic images;

a drum drive means operatively connected to the rotatable image transfer drum for rotating the drum in coordination with the movement of the continuous-form to transfer the received electrophotographic images onto the sheets as the continuous-form is moved past the image transfer station; an image fixing device at the image fixing station for fixing the transferred images to the individual sheets as the continuous sheet material is moved past the image fixing station; and printer control means operatively connected to the sheet feeding means and the drum drive means and having a sheet registration means that is responsive to at least stopping and restarting of movement of the continuous-form for (a) indexing the continuous-form relative to the image fixing station to register a portion of a sheet with the image fixing station when the continuous-form is stopped, and (b) indexing the continuous-form relative to the image transfer station to register a leading edge of a sheet with the image transfer drum when movement of the continuous-form is restarting.

12. The continuous-form electrophotographic printer of claim 11, wherein said sheet registration means is also responsive to the distances A and B.

13. The continuous-form electrophotographic printer of claim 11, wherein said portion is a leading portion of a sheet.

14. The continuous-form electrophotographic printer of claim 11, wherein said portion is a leading edge of a sheet.

15. The continuous-form electrophotographic printer of claim 13, wherein said sheet registration means is also responsive to the distances A and B.

16. The continuous-form electrophotographic printer as defined in claim 11, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

17. A continuous-form electrophotographic printer in accordance with claim 11, wherein said sheet portion has no image transferred thereon.

18. A continuous form electrophotographic printer in accordance with claim 11 wherein said sheet registration means is also responsive to the distance B.

19. In a continuous-form electrophotographic printer for printing on a continuous-form, in which the printer has: (a) sheet feeding means for conveying the continuous-form initially past an electrophotographic image transfer station and then past an image fixing station in which the image fixing station is spaced downstream of the image transfer station a preset station distance A; (b) a rotatable image transfer drum at the image transfer station for receiving electrophotographic images; (c) a drum drive means operatively connected to the rotatable image transfer drum for rotating the drum in coordination with movement of the continuous-form to transfer the received electrophotographic images onto the sheets as the continuous-form is moved past the image transfer station; (d) an image fixing device at the image fixing station for fixing the transferred images to the individual sheets as the continuous-form is moved past the image fixing station;

said continuous-form comprising a series of interconnected individual sheets each having a sheet length B between a leading edge and a trailing edge, in which the sheet length B is different than the station distance A; and printer control means operatively connected to the sheet feeding means and the drum drive means and having a sheet registration means that is responsive to at least stopping and restarting movement of the continuous-form for (a) indexing the continuous-form relative to the image fixing station to register a portion of a sheet with the image fixing station when the continuous-form is stopped, and (b) indexing the continuous-form relative to the image transfer station to register a leading edge of a sheet with the image transfer drum when the continuous-form is restarting.

20. In the continuous-form electrophotographic printer as defined in claim 19, a sheet length input device operatively connected to the printer control means to enable an operator to enter the value of distance B.

21. In the continuous-form electrophotographic printer of claim 19, wherein said sheet registration means is also responsive to the distances A and B.

22. In the continuous-form electrophotographic printer of claim 19, wherein said portion is a leading portion of a sheet.

23. In the continuous-form electrophotographic printer of claim 19, wherein said portion is a leading edge of a sheet.

24. In the continuous-form electrophotographic printer of claim 22, wherein said sheet registration means is also responsive to the distances A and B.

25. In the continuous-form electrophotographic printer as defined in claim 19, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

26. In a continuous-form electrophotographic printer in accordance with claim 19, wherein said sheet portion has no image transferred thereon.

27. In a continuous form electrophotographic printer in accordance with claim 19, wherein said sheet registration means is also responsive to the distance B.

28. In a continuous-form electrophotographic printer for printing fan-folded sheets of a continuous-form, in which each sheet has pin feed perforations along side edges, said printer having: (a) a rotatable image transfer drum at an image transfer station for receiving electrophotographic images; (b) an image fixing device at an image fixing station downstream of the image transfer station a preset station distance A for fixing the transferred images to the individual sheets as the continuous-form is moved past the image fixing station; (c) sheet feeding means having a feed tractor assembly with drive pins for projection into the side edge perforations to convey the continuous-form initially past an electrophotographic image transfer station and then past an image fixing station; (d) a drum drive means operatively connected to the rotatable image transfer drum for rotating the drum in coordination with the movement of the continuous-form to transfer the received electrophotographic images onto the sheets as the continuous-form is moved past the image transfer station;

said continuous-form comprising a series of interconnected individual sheets each having a sheet length B between a leading edge and a trailing edge, in which the sheet length B is different than the station distance A; and printer control means operatively connected to the sheet feeding means and to the drum drive means and having a sheet registration means that is responsive to at least stopping and restarting signals for (a) indexing the continuous-form relative to the image fixing station to register a portion of a sheet with the image fixing station when the continuous-form is stopped, and (b) indexing the continuous-form relative to the image transfer station to register a leading edge of a sheet with the image transfer station when movement of the continuous-form is restarted.

29. In the continuous-form electrophotographic printer as defined in claim 28, a sheet length input device operatively connected to the printer control means to enable an operator to enter the value of distance B.

30. In the continuous-form electrophotographic printer of claim 28, said sheet registration means also being responsive to the distances A and B.

31. In the continuous-form electrophotographic printer of claim 28, wherein said portion is a leading portion of a sheet.

32. In the continuous-form electrophotographic printer of claim 28, wherein said portion is a leading edge of a sheet.

33. In the continuous-form electrophotographic printer of claim 31, said sheet registration means also being responsive to the distances A and B.

34. In the continuous-form electrophotographic printer of claim 28, wherein said feed tractor assembly is spaced between the image transfer station and the image fixing station.

35. In the continuous-form electrophotographic printer as defined in claim 28, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

36. In a continuous-form electrophotographic printer in accordance with claim 28, wherein said sheet portion has no image transferred thereon.

37. In a continuous form electrophotographic printer in accordance with claim 28, wherein said sheet registration means is also responsive to the distance B.

38. A continuous-form electrophotographic printer for printing a continuous-form composed of a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different from the sheet length B;

an image transfer device at the image transfer station for transferring electrophotographic images onto the individual sheets as the continuous-form is conveyed past the image transfer station;

an image fixing device at the image fixing station for fixing the transferred images to the individual sheets as the continuous-form is conveyed past the image fixing station; and printer control means operatively connected to the sheet feeding means having a sheet registration means that is responsive to at least stopping and restarting of movement of the continuous-form for (a) indexing the continuous-form relative to the image fixing station to position a leading edge of a sheet at a predetermined position relative to the image fixing station when the continuous-form is stopped, and (b) indexing the continuous-form relative to the image transfer station to register a leading edge of a sheet with the image transfer station when movement of the continuous-form is restarted.

39. The continuous-form electrophotographic printer as defined in claim 38, wherein the image transfer device includes a photo conductor image transport with an image receiving surface and wherein the printer further comprises an image transfer drive means operatively connected to the photo conductor image transport for moving the image receiving surface in coordination with the movement of the continuous-form to transfer images to the registered sheets.

40. The continuous-form electrophotographic printer as defined in claim 39, wherein the printer control means is operatively connected to both the sheet feeding means and the image transfer drive means for normally moving the image receiving surface and the continuous-form in synchronization with each other while the images are being transferred to the sheets and for indexing the continuous-form relative to the image receiving surface when the continuous-form is being stopped and restarted.

41. The continuous-form electrophotographic printer of claim 38, wherein said sheet registration means is also responsive to the distances A and B.

42. The continuous-form electrophotographic printer of claim 38, wherein said predetermined position is near said image fixing station.

43. The continuous-form electrophotographic printer of claim 42, wherein said sheet registration means is also responsive to the distances A and B.

44. The continuous-form electrophotographic printer as defined in claim 38, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

45. A continuous form electrophotographic printer in accordance with claim 38, wherein said sheet registration means is also responsive to the distance B.

46. A continuous-form electrophotographic printer for printing on a continuous-form, in which the continuous-form comprises a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different than the sheet length B;

a rotatable image transfer drum at the image transfer station for receiving electrophotographic images;

a drum drive means operatively connected to the rotatable image transfer drum for rotating the drum in coordination with the movement of the continuous-form to transfer the received electrophotographic images onto the sheets as the continuous-form is moved past the image transfer station;

an image fixing device at the image fixing station for fixing the transferred images to the individual sheets as the continuous sheet material is moved past the image fixing station; and printer control means operatively connected to the sheet feeding means and the drum drive means and having a sheet registration means that is responsive to at least stopping and restarting of movement of the continuous-form for (a) indexing the continuous-form relative to the image fixing station to position a leading edge of a sheet at a predetermined position with respect to the image fixing station when the continuous-form is stopped, and (b) indexing the continuous-form relative to the image transfer station to register a leading edge of a sheet with the image transfer drum when movement of the continuous-form is restarting.

47. The continuous-form electrophotographic printer of claim 46, wherein said sheet registration means is also responsive to the distances A and B.

48. The continuous-form electrophotographic printer of claim 46, wherein said predetermined position is near said image fixing station.

49. The continuous-form electrophotographic printer of claim 48, wherein said sheet registration means is also responsive to the distances A and B.

50. The continuous-form electrophotographic printer as defined in claim 46, wherein the sheet registration means indexes the continuous-form forward a restarting distance that is equal to distance B minus the distance A, when distance A is less than distance B, to align a leading edge of a sheet at the image transfer station as the movement of the continuous-form is restarted.

51. A continuous form electrophotographic printer in accordance with claim 46, wherein said sheet registration means is also responsive to the distance B.

52. In a continuous-form electrophotographic printer for printing on a continuous-form, in which the printer has: (a) sheet feeding means for conveying the continuous-form initially past an electrophotographic image transfer station and then past an image fixing station in which the image fixing station is spaced downstream of the image transfer station a preset station distance A; (b) a rotatable image transfer drum at the image transfer station for receiving electrophotographic images; (c) a drum drive means operatively connected to the rotatable image transfer drum for rotating the drum in coordination with movement of the continuous-form to transfer the received electrophotographic images onto the sheets as the continuous-form is moved past the image transfer station; (d) an image fixing device at the image fixing station for fixing the transferred images to the individual sheets as the continuous-form is moved past the image fixing station;

said continuous-form comprising a series of interconnected individual sheets each having a sheet length B between a leading edge and a trailing edge, in which the sheet length B is different than the station distance A; and printer control means operatively connected to the sheet feeding means and the drum drive means and having a sheet registration means that is responsive to at least stopping and restarting movement of the continuous-form for (a) indexing the continuous-form relative to the image fixing station to position a leading edge of a sheet at a predetermined position relative to the image fixing station when the continuous-form is stopped, and (b) indexing the continuous-form relative to the image transfer station to register a leading edge of a sheet with the image transfer drum when the continuous-form is restarting.

53. In the continuous-form electrophotographic printer as defined in claim 52, a sheet length input device operatively connected to the printer control means to enable an operator to enter the value of distance B.

54. In the continuous-form electrophotographic printer of claim 52, wherein said sheet registration means is also responsive to the distances A and B.

55. In the continuous-form electrophotographic printer of claim 52, wherein said predetermined position is near said image fixing station.

56. In the continuous-form electrophotographic printer of claim 55, wherein said sheet registration means is also responsive to the distances A and B.

57. In the continuous-form electrophotographic printer as defined in claim 52, wherein the sheet registration means indexes the continuous-form forward a restarting distance that is equal to distance B minus the distance A, when distance A is less than distance B, to align a leading edge of a sheet at the image transfer station as the movement of the continuous-form is restarted.

58. In a continuous form electrophotographic printer in accordance with claim 52, wherein said sheet registration means is also responsive to the distance B.

59. In a continuous-form electrophotographic printer for printing fan-folded sheets of a continuous-form, in which each sheet has pin feed perforations along side edges, said printer having: (a) a rotatable image transfer drum at an image transfer station for receiving electrophotographic images; (b) an image fixing device at an image fixing station downstream of the image transfer station a preset station distance A for fixing the transferred images to the individual sheets as the continuous-form is moved past the image fixing station; (c) sheet feeding means having a feed tractor assembly to convey the continuous-form initially past an electrophotographic image transfer station and then past an image fixing station; (d) a drum drive means operatively connected to the rotatable image transfer drum for rotating the drum in coordination with the movement of the continuous-form to transfer the received electrophotographic images onto the sheets as the continuous-form is moved past the image transfer station;

said continuous-form comprising a series of interconnected individual sheets each having a sheet length B between a leading edge and a trailing edge, in which the sheet length B is different than the station distance A; and printer control means operatively connected to the sheet feeding means and to the drum drive means and having a sheet registration means that is responsive to at least stopping and restarting signals for (a) indexing the continuous-form relative to the image fixing station to position a leading edge of a sheet at a predetermined position relative to the image fixing station when the continuous-form is stopped, and (b) indexing the continuous-form relative to the image transfer station to register a leading edge of a sheet with the image transfer station when movement of the continuous-form is restarted.

60. In the continuous-form electrophotographic printer as defined in claim 59, a sheet length input device operatively connected to the printer control means to enable an operator to enter the value of distance B.

61. In the continuous-form electrophotographic printer of claim 59, said sheet registration means also being responsive to the distances A and B.

62. In the continuous-form electrophotographic printer of claim 59, wherein said predetermined position is near said image fixing station.

63. In the continuous-form electrophotographic printer of claim 62, said sheet registration means also being responsive to the distances A and B.

64. In the continuous-form electrophotographic printer of claim 59, wherein said feed tractor assembly is spaced between the image transfer station and the image fixing station.

65. In the continuous-form electrophotographic printer as defined in claim 59, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

66. In the continuous-form electrophotographic printer of claim 59, said feed tractor assembly having drive pins for projection into the side edge perforations.

67. In a continuous form electrophotographic printer in accordance with claim 59, wherein said sheet registration means is also responsive to the distance B.

68. A continuous-form electrophotographic printer for printing a continuous-form composed of a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different from the sheet length B;

an image transfer device at the image transfer station for transferring electrophotographic images onto the individual sheets as the continuous-form is conveyed past the image transfer station;

an image fixing device at the image fixing station for fixing the transferred images to the individual sheets as the continuous-form is conveyed past the image fixing station; and printer control means operatively connected to the sheet feeding means having a sheet registration means that is responsive to the distance A and B and to stopping and restarting of movement of the continuous-form for (a) indexing the continuous-form relative to the image fixing station to register a leading edge of a sheet with the image fixing station when the continuous-form is stopped, and (b) indexing the continuous-form relative to the image transfer station to register a leading edge of a sheet with the image transfer station when movement of the continuous-form is restarted.

69. The continuous-form electrophotographic printer as defined in claim 68, wherein the image transfer device includes a photo conductor image transport with an image receiving surface and wherein the printer further comprises an image transfer drive means operatively connected to the photo conductor image transport for moving the image receiving surface in coordination with the movement of the continuous-form to transfer images to the registered sheets.

70. The continuous-form electrophotographic printer as defined in claim 68, wherein the printer control means is operatively connected to both the sheet feeding means and the image transfer drive means for normally moving the image receiving surface and the continuous-form in synchronization with each other while the images are being transferred to the sheets and for indexing the continuous-form relative to the image receiving surface when the continuous-form is being stopped and restarted.

71. The continuous-form electrophotographic printer as defined in claim 68, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

72. A continuous-form electrophotographic printer for printing on a continuous-form, in which the continuous-form comprises a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different than the sheet length B;

a rotatable image transfer drum at the image transfer station for receiving electrophotographic images;

a drum drive means operatively connected to the rotatable image transfer drum for rotating the drum in coordination with the movement of the continuous-form to transfer the received electrophotographic images onto the sheets as the continuous-form is moved past the image transfer station;

an image fixing device at the image fixing station for fixing the transferred images to the individual sheets as the continuous sheet material is moved past the image fixing station; and printer control means operatively connected to the sheet feeding means and the drum drive means and having a sheet registration means that is responsive to the distances A and B and to stopping and restarting of movement of the continuous-form for (a) indexing the continuous-form relative to the image fixing station to register a leading edge of a sheet with the image fixing station when the continuous-form is stopped, and (b) indexing the continuous-form relative to the image transfer station to register a leading edge of a sheet with the image transfer drums when movement of the continuous-form is restarting.

73. The continuous-form electrophotographic printer as defined in claim 72, wherein the sheet registration means indexes the continuous-form forward a restarting distance that is equal to distance B minus the distance A, when distance A is less than distance B, to align a leading edge of a sheet at the image transfer station as the movement of the continuous-form is restarted.

74. In a continuous-form electrophotographic printer for printing on a continuous-form, in which the printer has: (a) sheet feeding means for conveying the continuous-form initially past an electrophotographic image transfer station and then past an image fixing station in which the image fixing station is spaced downstream of the image transfer station a preset station distance A; (b) a rotatable image transfer drum at the image transfer station for receiving electrophotographic images; (c) a drum drive means operatively connected to the rotatable image transfer drum for rotating the drum in coordination with movement of the continuous-form to transfer the received electrophotographic images onto the sheets as the continuous-form is moved past the image transfer station; (d) an image fixing device at the image fixing station for fixing the transferred images to the individual sheets as the continuous-form is moved past the image fixing station;

said continuous-form comprising a series of interconnected individual sheets each having a sheet length B between a leading edge and trailing edge, in which the sheet length B is different than the station distance A; and printer control means operatively connected to the sheet feeding means and the drum drive means and having a sheet registration means that is responsive to the distances A and B and to stopping and restarting movement of the continuous-form for (a) indexing the continuous-form relative to the image fixing station to register a leading edge of a sheet with the image fixing station when the continuous-form is stopped, and (b) indexing the continuous-form relative to the image transfer station to register a leading edge of a sheet with the image transfer drum when the continuous-form is restarting.

75. In the continuous-form electrophotographic printer as defined in claim 74, a sheet length input device operatively connected to the printer control means to enable an operator to enter the value of distance B.

76. In the continuous-form electrophotographic printer as defined in claim 74, wherein the sheet registration means indexes the continuous-form forward a restarting distance that is equal to distance B minus the distance A, when distance A is less than distance B, to align a leading edge of a sheet at the image transfer station as the movement of the continuous-form is restarted.

77. In a continuous-form electrophotographic printer for printing fan-folded sheets of a continuous-form, in which each sheet has pin feed perforations along side edges, said printer having: (a) a rotatable image transfer drum at an image transfer station for receiving electrophotographic images; (b) an image fixing device at an image fixing station downstream of the image transfer station a preset station distance A for fixing the transferred images to the individual sheets as the continuous-form is moved past the image fixing station; (c) sheet feeding means having a feed tractor assembly to convey the continuous-form initially past an electrophotographic image transfer station and then past an image fixing station; (d) a drum drive means operatively connected to the rotatable image transfer drum for rotating the drum in coordination with the movement of the continuous-form to transfer the received electrophotographic images onto the sheets as the continuous-form is moved past the image transfer station;

said continuous-form comprising a series of interconnected individual sheets each having a sheet length B between a leading edge and a trailing edge, in which the sheet length B is different than the station distance A; and printer control means operatively connected to the sheet feeding means and to the drum drive means and having a sheet registration means that is responsive to the distance A and B and to stopping and restarting signals for (a) indexing the continuous-form relative to the image fixing station to register a leading edge of a sheet with the image fixing station when the continuous-form is stopped, and (b) indexing the continuous-form relative to the image transfer station to register a leading edge of a sheet with the image transfer station when movement of the continuous-form is restarted.

78. In the continuous-form electrophotographic printer as defined in claim 77, a sheet length input device operatively connected to the printer control means to enable an operator to enter the value of distance B.

79. In the continuous-form electrophotographic printer as defined in claim 77, wherein the sheet registration means indexes the continuous-form forward a restarting distance D that is equal to distance B minus the distance A, when distance A is less than distance B, to align a leading edge of a sheet at the image transfer station as the movement of the continuous-form is restarted.

80. In the continuous-form electrophotographic printer as defined in claim 77, wherein said assembly is spaced between the image transfer station and the image fixing station.

81. In the continuous-form electrophotographic printer as defined in claim 77, wherein said assembly includes drive pins for projection into the side edge perforations.

82. In the continuous-form electrophotographic printer as defined in claim 81, wherein said assembly is spaced between the image transfer station and the image fixing station.

83. A continuous-form electrophotographic printer for printing a continuous-form composed of a series of interconnected individual sheets each having a sheet length defined between a leading edge and a trailing edge of each individual sheet, said printer comprising:

sheet feeding means for conveying the continuous-form initially past an electrophotographic image transfer station and then past an image fixing station;

said image fixing station being spaced downstream of the image transfer station by a preset sheet movement distance that is different from the sheet length;

an image transfer device at the image transfer station for transferring electrophotographic images onto the individual sheets as the continuous-form is conveyed past the image transfer station;

an image fixing device at the image fixing station for fixing the transferred images to the individual sheets as the continuous-form is conveyed past the image fixing station; and printer control means operatively connected to the sheet feeding means for feeding said continuous-form to position a sheet portion on which an image has not been transferred at said image fixing station when forward feeding of the continuous-form is stopped, and for indexing the continuous-form relative to the image transfer station to position a leading edge of a sheet adjacent to the image transfer station when movement of the continuous-form is restarted.

84. The continuous-form electrophotographic printer as defined in claim 83, wherein the image transfer device includes a photoconductive drum with an image receiving surface, means for moving the drum in coordination with the movement of the continuous-form to transfer images to the registered sheets, and means for indexing the continuous-form relative to the drum when the continuous-form is being stopped and restarted.

85. A continuous-form electrophotographic printer for printing on a continuous-form, in which the continuous-form comprises a series of interconnected individual sheets each having a sheet length between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance that is different than the sheet length;

a rotatable image transfer drum at the image transfer station for receiving electrophotographic images, and drive means for rotating the drum in coordination with the movement of the continuous-form to transfer the received electrophotographic images onto the sheets as the continuous-form is moved past the image transfer station;

an image fixing device at the image fixing station for fixing the transferred images to the individual sheets as the continuous sheet material is moved past the image fixing station; and printer control means for controlling the sheet feeding means and the drum drive means for feeding said continuous-form to position a sheet portion on which an image has not been transferred at said image fixing station when forward feeding of the continuous-form is stopped, and for indexing the continuous-form relative to the image transfer station to position a leading edge of a sheet adjacent to the image transfer drum when movement of the continuous-form is restarting.

86. In a continuous-form electrophotographic printer for printing on a continuous-form, in which the printer has: (a) sheet feeding means for conveying the continuous-form initially past an electrophotographic image transfer station and then past an image fixing station in which the image fixing station is spaced downstream of the image transfer station by a preset station distance; (b) a rotatable image transfer drum at the image transfer station for receiving electrophotographic images; (c) drum drive means for rotating the drum in coordination with movement of the continuous-form to transfer the received electrophotographic images onto the sheets as the continuous-form is moved past the image transfer station; (d) an image fixing device at the image fixing station for fixing the transferred images to the individual sheets as the continuous-form is moved past the image fixing station;

said continuous-form comprising a series of interconnected individual sheets each having a sheet length between a leading edge and trailing edge, in which the sheet length is different than the preset station distance; and printer control means operatively connected to the sheet feeding means for feeding said continuous-form to position a sheet portion on which an image has not been transferred at said image fixing station when forward movement of the continuous-form is stopped, and for indexing the continuous-form relative to the image transfer station to position a leading edge of a sheet adjacent to the image transfer drum when the continuous-form is restarting.

87. In a continuous-form electrophotographic printer for printing fan-folded sheets of a continuous-form, in which each sheet has pin feed perforations along side edges, said printer having: (a) a rotatable image transfer drum at an image transfer station for receiving electrophotographic images; (b) an image fixing device at an image fixing station positioned downstream of the image transfer station by a preset station distance for fixing the transferred images to the individual sheets as the continuous-form is moved past the image fixing station; (c) sheet feeding means having a feed tractor assembly for conveying the continuous-form initially past an electrophotographic image transfer station and then past an image fixing station; (d) drum drive means for rotating the drum in coordination with movement of the continuous-form to transfer the received electrophotographic images onto the sheets as the continuous-form is moved past the image transfer station;

said continuous-form comprising a series of interconnected individual sheets each having a sheet length defined between a leading edge and a trailing edge of each sheet, in which the sheet length is different than the preset station distance; and printer control means operatively connected to the sheet feeding means for feeding said continuous form to position a sheet portion on which an image has not been transferred at said image fixing station when forward movement of the continuous-form is stopped, and for indexing the continuous-form relative to the image transfer station to position a leading edge of a sheet adjacent to the image transfer station when movement of the continuous-form is restarted.

88. A continuous-form electrophotographic printer for printing a continuous-form composed of a series of interconnected individual sheets each having a sheet length B between a leading edge and a trailing edge, said printer comprising:

sheet feeding means for conveying the continuous-form initially past an electrophotographic image transfer station and then past an image fixing station;

said image fixing station being spaced downstream of the image transfer station by a preset sheet movement distance A that is different from the sheet length B;

an image transfer device at the image transfer station for transferring electrophotographic images onto the individual sheets as the continuous-form is conveyed past the image transfer station;

an image fixing device at the image fixing station for fixing the transferred images to the individual sheets as the continuous-form is conveyed past the image fixing station; and printer control means operatively connected to the sheet feeding means having a sheet registration means that is responsive to at least the distance B and stopping and restarting of movement of the continuous-form for (a) indexing the continuous-form relative to the image fixing station to register a portion of a sheet with the image fixing station when the continuous-form is stopped, and (b) indexing the continuous-form relative to the image transfer station to register a leading edge of a sheet with the image transfer station when movement of the continuous-form is restarted.

* * * * *

UNITED STATES PATENT AND TRADEMARK OFFICE
CERTIFICATE OF CORRECTION

PATENT NO. : 5,565,972
DATED : October 15, 1996
INVENTOR(S) : R. Honda, et. al.

It is certified that error appears in the above-indentified patent and that said Letters Patent is hereby corrected as shown below:

```
Title page, item [30], insert --"Foreign Application Priority Data",
June 13, 1989   [JP] Japan.............1-149976--.
```

Signed and Sealed this

Eighth Day of April, 1997

Attest:

BRUCE LEHMAN

*Attesting Officer*   Commissioner of Patents and Trademarks